(12) United States Patent
Wilson et al.

(10) Patent No.: US 6,464,461 B2
(45) Date of Patent: Oct. 15, 2002

(54) STEAM COOLING SYSTEM FOR A GAS TURBINE

(75) Inventors: Ian David Wilson, Mauldin, SC (US); Kevin Joseph Barb, Halfmoon, NY (US); Ming Cheng Li, Cincinnati, OH (US); Susan Marie Hyde, Schenectady, NY (US); Thomas Charles Mashey, Coxsackie, NY (US); Ronald Richard Wesorick, Albany, NY (US); Christopher Charles Glynn, Hamilton, OH (US); Martin C. Hemsworth, Cincinnati, OH (US)

(73) Assignee: General Electric Company, Schenectady, NY (US)

( * ) Notice: Subject to any disclaimer, the term of this patent is extended or adjusted under 35 U.S.C. 154(b) by 129 days.

(21) Appl. No.: 09/731,982

(22) Filed: Dec. 8, 2000

(65) Prior Publication Data

US 2001/0006601 A1 Jul. 5, 2001

Related U.S. Application Data

(63) Continuation of application No. 09/379,580, filed on Aug. 24, 1999.

(51) Int. Cl.⁷ .................................................. F01D 5/08
(52) U.S. Cl. ...................... 416/96 R; 415/116; 415/134; 285/205
(58) Field of Search .................................. 415/114, 115, 415/116, 117, 134, 135; 416/95, 96 A, 96 R, 97 R, 198 A, 201 R; 285/205, 506, 305; 60/39.182, 39.75; 137/561 A

(56) References Cited

U.S. PATENT DOCUMENTS

| | | | |
|---|---|---|---|
| 4,190,398 A | * | 2/1980 | Corsmeier et al. .......... 415/114 |
| 5,318,404 A | | 6/1994 | Carreno et al. ............ 416/96 R |
| 5,593,274 A | | 1/1997 | Carreno et al. ............. 415/115 |
| 5,984,637 A | * | 11/1999 | Matsuo ...................... 416/97 R |
| 6,000,909 A | * | 12/1999 | Hirokawa et al. ......... 416/96 R |
| 6,094,905 A | * | 8/2000 | Fukuyama ................... 415/115 |

OTHER PUBLICATIONS

"39$^{th}$ GE Turbine State–of–the–Art Technology Seminar", Tab 1, ""F" Technology—the First Half–Million Operating Hours", H.E. Miller, Aug. 1996.

"39th GE Turbine State–of–the–Art Technology Seminar", Tab 2, "GE Heavy–Duty Gas Turbine Performance Characteristics", F. J. Brooks, Aug. 1996.

"39th GE Turbine State–of–the–Art Technology Seminar", Tab 3, "9EC 50Hz 170–MW Class Gas Turbine", A. S. Arrao, Aug. 1996.

(List continued on next page.)

*Primary Examiner*—Edward K. Look
*Assistant Examiner*—Richard A Edgar
(74) *Attorney, Agent, or Firm*—Nixon & Vanderhye

(57) ABSTRACT

The steam cooling circuit for a gas turbine includes a bore tube assembly supplying steam to circumferentially spaced radial tubes coupled to supply elbows for transitioning the radial steam flow in an axial direction along steam supply tubes adjacent the rim of the rotor. The supply tubes supply steam to circumferentially spaced manifold segments located on the aft side of the 1-2 spacer for supplying steam to the buckets of the first and second stages. Spent return steam from these buckets flows to a plurality of circumferentially spaced return manifold segments disposed on the forward face of the 1-2 spacer. Crossover tubes couple the steam supply from the steam supply manifold segments through the 1-2 spacer to the buckets of the first stage. Crossover tubes through the 1-2 spacer also return steam from the buckets of the second stage to the return manifold segments. Axially extending return tubes convey spent cooling steam from the return manifold segments to radial tubes via return elbows.

28 Claims, 14 Drawing Sheets

OTHER PUBLICATIONS

"39th GE Turbine State–of–the–Art Technology Seminar", Tab 4, "MWS6001FA—An Advanced–Technology 70–MW Class 50/60 Hz Gas Turbine", Ramachandran et al., Aug. 1996.

"39th GE Turbine State–of–the–Art Technology Seminar", Tab 5, "Turbomachinery Technology Advances at Nuovo Pignone", Benvenuti et al., Aug. 1996.

"39th GE Turbine State–of–the–Art Technology Seminar", Tab 6, "GE Aeroderivative Gas Turbine—Design and Operating Features", M.W. Horner, Aug. 1996.

"39th GE Turbine State–of–the–Art Technology Seminar", Tab 7, "Advance Gas Turbine Materials and Coatings", P.W. Schilke, Aug. 1996.

"39th GE Turbine State–of–the–Art Technology Seminar", Tab 8, "Dry Low $NO_X$ Combustion Systems for GE Heavy –Duty Turbines", L. B. Davis, Aug. 1996.

"39th GE Turbine State–of–the–Art Technology Seminar", Tab 9, "GE Gas Turbine Combustion Flexibility", M. A. Davi, Aug. 1996.

"39th GE Turbine State–of–the–Art Technology Seminar", Tab 10, "Gas Fuel Clean–Up System Design Considerations for GE Heavy–Duty Gas Turbines", C. Wilkes, Aug. 1996.

"39th GE Turbine State–of–the–Art Technology Seminar", Tab 11, "Integrated Control Systems for Advanced Combined Cycles", Chu et al., Aug. 1996.

"39th GE Turbine State–of–the–Art Technology Seminar", Tab 12, "Power Systems for the 21st Century "H" Gas Turbine Combined Cycles", Paul et al., Aug. 1996.

"39th GE Turbine State–of–the–Art Technology Seminar", Tab 13, "Clean Coal and Heavy Oil Technologies for Gas Turbines", D. M. Todd, Aug. 1996.

"39th GE Turbine State–of–the–Art Technology Seminar", Tab 14, "Gas Turbine Conversions, Modifications and Uprates Technology", Stuck et al., Aug. 1996.

"39th GE Turbine State–of–the–Art Technology Seminar", Tab 15, "Performance and Reliability Improvements for Heavy–Duty Gas Turbines, "J. R. Johnston, Aug. 1996.

"39th GE Turbine State–of–the–Art Technology Seminar", Tab 16, "Gas Turbine Repair Technology", Crimi et al, Aug. 1996.

"39th GE Turbine State–of–the–Art Technology Seminar", Tab 17, "Heavy Duty Turbine Operating & Maintenance Considerations", R.F. Hoeft, Aug. 1996.

"39th GE Turbine State–of–the–Art Technology Seminar", Tab 18, "Gas Turbine Performance Monitoring and Testing", Schmitt et al., Aug. 1996.

"39th GE Turbine State–of–the–Art Technology Seminar", Tab 19, "Monitoring Service Delivery System and Diagnostics", Madej et al., Aug. 1996.

"39th GE Turbine State–of–the–Art Technology Seminar", Tab 20, "Steam Turbines for Large Power Applications", Reinker et al., Aug. 1996.

"39th GE Turbine State–of–the–Art Technology Seminar", Tab 21, "Steam Turbines for Ultrasupercritical Power Plants", Retzlaff et al., Aug. 1996.

"39th GE Turbine State–of–the–Art Technology Seminar", Tab 22, "Steam Turbine Sustained Efficiency", P. Schofield, Aug. 1996.

"39th GE Turbine State–of–the–Art Technology Seminar", Tab 23, "Recent Advances in Steam Turbines for Industrial and Cogeneration Applications", Leger et al., Aug. 1996.

"39th GE Turbine State–of–the–Art Technology Seminar", Tab 24, "Mechanical Drive Steam Turbines", D. R. Leger, Aug. 1996.

"39th GE Turbine State–of–the–Art Technology Seminar", Tab 25, "Steam Turbines for STAG™ Combined–Cycle Power Systems", M. Boss, Aug. 1996.

"39th GE Turbine State–of–the–Art Technology Seminar", Tab 26, "Cogeneration Application Considerations", Fisk et al., Aug. 1996.

"39th GE Turbine State–of–the–Art Technology Seminar", Tab 27, "Performance and Economic Considerations of Repowering Steam Power Plants", Stoll et al., Aug. 1996.

"39th GE Turbine State–of–the–Art Technology Seminar", Tab 28, "High –Power–Density™ Steam Turbine Design Evolution", J. H. Moore, Aug. 1996.

"39th GE Turbine State–of–the–Art Technology Seminar", Tab 29, "Advances in Steam Path Technologies", Cofer, IV, et al., Aug. 1996.

"39th GE Turbine State–of–the–Art Technology Seminar", Tab 30, "Upgradable Opportunities for Steam Turbines", D. R. Dreier, Jr., Aug. 1996.

"39th GE Turbine State–of–the–Art Technology Seminar", Tab 31, "Uprate Options for Industrial Turbines", R. C. Beck, Aug. 1996.

"39th GE Turbine State–of–the–Art Technology Seminar", Tab 32, "Thermal Performance Evaluation and Assessment of Steam Turbine Units", P. Albert, Aug. 1996.

"39th GE Turbine State–of–the–Art Technology Seminar", Tab 33, "Advances in Welding Repair Technology" J. F. Nolan, Aug. 1996.

"39th GE Turbine State–of–the–Art Technology Seminar", Tab 34, "Operation and Maintenance Strategies to Enhance Plant Profitability", MacGillivray et al., Aug. 1996.

"39th GE Turbine State–of–the–Art Technology Seminar", Tab 35, "Generator Insitu Inspections", D. Stanton.

"39th GE Turbine State–of–the–Art Technology Seminar", Tab 36, "Generator Upgrade and Rewind", Halpern et al., Aug. 1996.

"39th GE Turbine State–of–the–Art Technology Seminar", Tab 37, "GE Combined Cycle Product Line and Performance", Chase, et al., Aug. 1996.

"39th GE Turbine State–of–the–Art Technology Seminar", Tab 38, "GE Combined Cycle Experience", Maslak et al., Aug. 1996.

"39th GE Turbine State–of–the–Art Technology Seminar", Tab 39, "Single–Shaft Combined Cycle Power Generation Systems", Tomlinson et al., Aug. 1996.

"Advanced Turbine System Program—Conceptual Design and Product Development", Annual Report, Sep. 1, 1994— Aug. 31, 1995.

"Advanced Turbine Systems (ATS Program) Conceptual Design and Product Development", Final Technical Progress Report, Vol. 2– Industrial Machine, Mar. 31, 1997, Morgantown, WV.

"Advanced Turbine Systems (ATS Program), Conceptual Design and Product Development", Final Technical Progress Report, Aug. 31, 1996, Morgantown, WV.

"Advanced Turbine Systems (ATS) Program, Phase 2, Conceptual Design and Product Development", Yearly Techical Progress Report, Reporting Period: Aug. 25, 1993—Aug. 31, 1994.

"Advanced Turbine Systems" Annual Program Review, Preprints, Nov. 2–4, 1998, Washington, D.C. U.S. Department of Energy, Office of Industrial Technologies Federal Energy Technology Center.
"ATS Conference" Oct. 28, 1999, Slide Presentation.
"Baglan Bay Launch Site", various articles relating to Baglan Energy Park.
"Baglan Energy Park", Brochure.
"Commercialization", Del Williamson, Present, Global Sales, May 8, 1998.
"Environmental, Health and Safety Assessment: ATS 7H Program (Phase 3R) Test Activities at the GE Power Systems Gas Turbine Manufacturing Facility, Greenville, SC", Document #1753, Feb. 1998, Publication Date: Nov. 17, 1998, Report Nos. DE–FC21–95MC31176—11.
"Exhibit panels used at 1995 product introduction at PowerGen Europe".
"Extensive Testing Program Validates High Efficiency, reliability of GE's Advanced "H" Gas Turbine Technology", Press Information, Press Release, 96–NR14, Jun. 26, 1996, H Technology Tests/pp. 1–4.
"Extensive Testing Program Validates High Efficiency, Reliability of GE's Advanced "H" Gas Turbine Technology", GE Introduces Advanced Gas Turbine Technology Platform: First to Reach 60% Combined–Cycle Power Plant Efficiency Press Information, Press Release, Power–Gen Europe '95, 95–NRR15, Advanced Technology Introduction/pp. 1–6.
"Gas, Steam Turbine Work as Single Unit in GE's Advanced H Technology Combined–Cycle System", Press Information, Press Releas, 95–NR18, May 16, 1995, Advanced Technology Introduction/pp. 1–3.
"GE Breaks 60% Net Efficiency Barrier" paper, 4 pages.
"GE Businesses Share Technologies and Experts to Develop State–Of–The–Art Products", Press Information, Press Release 95–NR10, May 16, 1995, GE Technology Transfer/pp. 1–3.
"General Electric ATS Program Technical Review, Phase 2 Activities", T. Chance et al., pp. 1–4.
"General Electric's DOE/ATS H Gas Turbine Development" Advanced Turbine Systems Annual Review Meeting, Nov. 7–8, 1996, Washington, D.C., Publication Release.
"H Technology Commercialization", 1998 MarComm Activity Recommendation, Mar., 1998.
"H Technology", Jon Ebacher, VP, Power Gen Technology, May 8, 1998.
"H Testing Process", Jon Ebacher, VP, Power Gen Technology, May 8, 1998.
"Heavy–Duty & Aeroderivative Products" Gas Turbines, Brochure, 1998.
"MS7001H/MS9001H Gas Turbine, gepower.com website for PowerGen Europe" Jun. 1–3 going public Jun. 15, (1995).
"New Steam Cooling System is a Key to 60% Efficiency For GE "H" Technology Combined–Cycle Systems", Press Information, Press Release, 95–NRR16, May 16, 1995, H Technology/pp. 1–3.
"Overview of GE's H Gas Turbine Combined Cycle", Jul. 1, 1995 to Dec. 31, 1997.
"Power Systems for the 21$^{st}$ Century—"H" Gas Turbine Combined Cycles", Thomas C. Paul et al., Report.
"Power–Gen '96 Europe", Conference Programme, Budapest, Hungary, Jun. 26–28, 1996.
"Power–Gen International", 1998 Show Guide, Dec. 9–11, 1998, Orange County Convention Center, Orlando, Florida.

"Press Coverage following 1995 product announcement"; various newspaper clippings relating to improved generator.
"Proceedings of the Advanced Turbine Systems Annual Program Review Meeting", vol. I, "Industrial Advanced Turbine Systems Program Overview", D.W. Esbeck, pp. 3–13, Oct., 1995.
"Proceedings of the Advanced Turbine Systems Annual Program Review Meeting", vol. I, "H Gas Turbine Combined Cycle", J. Corman, pp. 14–21, Oct., 1995.
"Proceedings of the Advanced Turbine Systems Annual Program Review Meeting", vol. I, "Overview of Westinghouse's Advanced Turbine Sytsems Program", Bannister et al., pp. 22–30, Oct., 1995.
"Proceedings of the Advanced Turbine Systems Annual Program Review Meeting", vol. I, "Allison Engine ATS Program Technical Review", D. Mukavetz, pp. 31–42, Oct., 1995.
"Proceedings of the Advanced Turbine Systems Annual Program Review Meeting", vol. I, "Advanced Turbine Systems Program Industrial System Concept Development", S. Gates, pp. 43–63, Oct., 1995.
"Proceedings of the Advanced Turbine Systems Annual Program Review Meeting", vol. I, "Advanced Turbine System Program Phase 2 Cycle Selection", Latcovich, Jr., pp. 64–69, Oct., 1995.
"Proceedings of the Advanced Turbine Systems Annual Program Review Meeting", vol. I, "General Electric ATS Program Technical Review Phase 2 Activities", Chance et al., pp. 70–74, Oct., 1995.
"Proceedings of the Advanced Turbine Systems Annual Program Review Meeting", vol. I, "Technical Review of Westinghouse's Advanced Turbine Systems Program", Diakunchak et al., pp. 75–86, Oct. 1995.
"Proceedings of the Advanced Turbine Systems Annual Program Review Meeting", vol. I, "Advanced Combustion Turbines and Cycles: An EPRI Perspective", Touchton et al., pp. 87–88, Oct., 1995.
"Proceedings of the Advanced Turbine Systems Annual Program Review Meeting", vol. I, "Advanced Turbine Systems Annual Program Review", William E. Koop, pp. 89–92, Oct., 1995.
"Proceedings of the Advanced Turbine Systems Annual Program Review Meeting", vol. I, "The AGTSR Consortium: An Update", Fant et al., pp. 93–102, Oct., 1995.
"Proceedings of the Advanced Turbine Systems Annual Program Review Meeting", vol. I, "Overview of Allison/AGTSR Interactions", Sy A. Ali, pp. 103–106, Oct., 1995.
"Proceedings of the Advanced Turbine Systems Annual Program Review Meeting", vol. I, "Design Factors for Stable Lean Premix Combustion", Richards et al., pp. 107–113, Oct., 1995.
"Proceedings of the Advanced Turbine Systems Annual Program Review Meeting", vol. I, "Ceramic Stationary as Turbine", M. van Roode, pp. 114–147, Oct., 1995.
"Proceedings of the Advanced Turbine Systems Annual Program Review Meeting", vol. I, "DOE/Allison Ceramic Vane Effort", Wenglarz et al., pp. 148–151, Oct., 1995.
"Proceedings of the Advanced Turbine Systems Annual Program Review Meeting", vol. I, "Materials/Manufacturing Element of the Advanced Turbine Systems Program", Karnitz et al., pp. 152–160, Oct., 1995.
"Proceedings of the Advanced Turbine Systems Annual Program Review Meeting", vol. I, "Land–Based Turbine Casting Initiative", Mueller et al., pp. 161–170, Oct., 1995.

"Proceedings of the Advanced Turbine Systems Annual Program Review Meeting", vol. I, "Turbine Airfoil Manufacturing Technology", Kortovich, pp. 171–181, Oct., 1995.

"Proceedings of the Advanced Turbine Systems Annual Program Review Meeting", vol. I, "Pratt & Whitney Thermal Barrier Coatings", Bornstein et al., pp. 182–193, Oct., 1995.

"Proceedings of the Advanced Turbine Systems Annual Program Review Meeting", vol. I, "Westinhouse Thermal Barrier Coatings",Goedjen et al., pp. 194–199, Oct., 1995.

"Proceedings of the Advanced Turbine Systems Annual Program Review Meeting", vol. I, "High Performance Steam Development", Duffy et al., pp. 200–220, Oct., 1995.

"Proceedings of the Advanced Turbine Systems Annual Program Review Meeting", vol. II, "Lean Premixed Combustion Stabilized by Radiation Feedback and heterogeneous Catalysis", Dibble et al., pp. 221–232.

"Proceedings of the Advanced Turbine Systems Annaul Program Review Meeting", vol. II, Rayleigh/Raman/LIF Measurements in a Turbulent Lean Premixed Combustor, Nandula et al. p. 233–248, Oct., 1995.

"Proceedings of the Advanced Turbine Systems Annual Program Review Meeting", vol. II, "Lean Premixed Flames for Low $No_x$ Combustors", Sojka et al., pp. 249–275, Oct., 1995.

"Proceedings of the Advanced Turbine Systems Annual Program Review Meeting", vol. II, "Functionally Gradient Materials for Thermal Barrier Coatings in Advanced Gas Turbine Systems", Banovic et al., pp. 276–280, Oct., 1995.

"Proceedings of the Advanced Turbine Systems Annual Program Review Meeting", vol. II, "Advanced Turbine Cooling, Heat Transfer, and Aerodynamic Studies", Han et al., pp. 281–309, Oct., 1995.

"Proceedings of the Advanced Turbine Systems Annual Program Review Meeting", vol. II, "Life Prediction of Advanced Materials for Gas Turbine Application", Zamrik et al., pp. 310–327, Oct., 1995.

"Proceedings of the Advanced Turbine Systems Annual Program Review Meeting", vol. II, "Advanced Combustion Technologies for Gas Turbine Power Plants", Vandsburger et al., p. 328–352, Oct., 1995.

"Proceedings of the Advanced Turbine Systems Annual Program Review Meeting", vol. II, "Combustion Modeling in Advanced Gas Turbine Systems", Smoot et al., pp. 353–370, Oct., 1995.

"Proceedings of the Advanced Turbine Systems Annual Program Review Meeting", vol. II, "Heat Transfer in a Two–Pass Internally Ribbed Turbine Blade Coolant Channel with Cylindrical Vortex Generators", Hibbs et al. pp. 371–390, Oct., 1995.

"Proceedings of the Advanced Turbine Systems Annual Program Review Meeting", vol. II, "Rotational Effects on Turbine–Blade Cooling",Govatzidakia et al., pp. 391–392, Oct., 1995.

"Proceedings of the Advanced Turbine Systems Annual Program Review Meeting", vol. II, "Manifold Methods for Methane Combustion",Yang et al., pp. 393–409, Oct., 1995.

"Proceedings of the Advanced Turbine Systems Annual Program Review Meeting", vol. II, "Advanced Multistage Turbine Blade Aerodynamics, Performance, Cooling, and Heat Transfer", Fleeter et al., pp. 410–414, Oct., 1995.

"Proceedings of the Advanced Turbine Systems Annual Program Review Meeting, vol. II", The Role of Reactant Unmixedness, Strain Rate, and Length Scale on Premixed Combustor Performance, Samuelsen et al., pp. 415–422, Oct., 1995.

"Proceedings of the Advanced Turbine Systems Annual Program Review Meeting", vol. II, "Experimental and Computational Studies of Film Cooling With Compound Angle Injection", Goldstein et al., pp. 423–451, Oct., 1995.

"Proceedings of the Advanced Turbine Systems Annual Program Review Meeting", vol. II, "Compatibility of Gas Turbine Materials with Steam Cooling", Desai et al., pp. 452–464, Oct., 1995.

"Proceedings of the Advanced Turbine Systems Annual Program Review Meeting", vol. II, "Use of a Laser–Induced Fluorescence Thermal Imaging System for Film Cooling Heat Transfer Measurement", M. K. Chyu, pp. 465–473, Oct., 1995.

"Proceedings of the Advanced Turbine Systems Annual Program Review Meeting", vol. II, Effects of Geometry on Slot–Jet Film Cooling Performance, Hyams et al., pp. 474–496, Oct., 1995.

"Proceedings of the Advanced Turbine Systems Annual Program Review Meeting", vol. II, "Steam as Turbine Blade Coolant: Experimental Data Generation", Wilmsen et al., pp. 497–505, Oct., 1995.

"Proceedings of the Advanced Turbine Systems Annual Program Review Meeting", vol. II, "Combustion Chemical Vapor Deposited Coatings for Thermal Barrier Coating Systems", Hampikian et al., pp. 506–515, Oct., 1995.

"Proceedings of the Advanced Turbine Systems Annual Program Review Meeting", vol. II, "Premixed Burner Experiments: Geometry, Mixing, and Flame Structure Issues", Gupta et al., pp. 516–528, Oct., 1995.

"Proceedings of the Advanced Turbine Systems Annual Program Review Meeting", vol. II, "Intercooler Flow Path for Gas Turbines: CFD Design and Experiments", Agrawal et al., pp. 529–538, Oct., 1995.

"Proceedings of the Advanced Turbine Systems Annual Program Review Meeting", vol. II, "Bond Strength and Stress Measurements in Thermal Barrier Coatings", Gell et al., pp. 539–549, Oct., 1995.

"Proceedings of the Advanced Turbine Systems Annual Program Review Meeting", vol. II, "Active Control of Combustion Instabilities in Low $NO_x$ Gas Turbines", Zinn et al., pp. 550–551, Oct., 1995.

"Proceedings of the Advanced Turbine Systems Annual Program Review Meeting", vol. II, "Combustion Instability Modeling and Analysis", Santoro et al., pp. 552–559, Oct., 1995.

"Proceedings of the Advanced Turbine Systems Annual Program Review Meeting", vol. II, "Flow and Heat Transfer in Gas Turbine Disk Cavities Subject to Nonuniform External Pressure Field", Roy et al., pp. 560–565, Oct., 1995.

"Proceedings of the Advanced Turbine Systems Annual Program Review Meeting", vol. II, "Heat Pipe Turbine Vane Cooling", Langston et al., pp. 566–572, Oct., 1995.

"Proceedings of the Advanced Turbine Systems Annual Program Review Meeting", vol. II, "Improved Modeling Techniques for Turbomachinery Flow Fields", Lakshminarayana et al., pp. 573–581, Oct., 1995.

"Proceedings of the Advanced Turbine Systems Annual Program Review Meeting"vol. II, "Advanced 3D Inverse Method for Designing Turbomachine Blades", T. Dang, pp. 582, Oct., 1995.

"Proceedings of the Advanced Turbine Systems Annual Program Review Meeting", "ATS and the Industries of the Future", Denise Swink, p. 1, Nov., 1996.

"Proceedings of the Advanced Turbine Systems Annual Program Review Meeting", "Gas Turbine Association Agenda", William H. Day, pp. 3–16, Nov., 1996.

"Proceedings of the Advanced Turbine Systems Annual Program Review Meeting", "Power Needs in the Chemical Industry", Keith Davidson, pp. 17–26, Nov., 1996.

"Proceedings of the Advanced Turbine Systems Annual Program Review Meeting", "Advanced Turbine Systems Program Overview", David Esbeck, pp. 27–34, Nov., 1996.

"Proceedings of the Advanced Turbine Systems Annual Program Review Meeting", "Westinghouse's Advanced Turbine Systems Program", Gerard McQuiggan, pp. 35–48, Nov., 1996.

"Proceedings of the Advanced Turbine Systems Annual Program Review Meeting", "Overview of GE's H Gas Turbine Combined Cycle", Cook et al., pp. 49–72, Nov., 1996.

"Proceedings of the Advanced Turbine Systems Annual Program Review Meeting", "Allison Advanced Simple Cycle Gas Turbine System", William D. Weisbrod, pp. 73–94, Nov., 1996.

"Proceedings of the Advanced Turbine Systems Annual Program Review Meeting", "The AGTSR Industry–University Consortium", Lawrence P. Golan, pp. 95–110, Nov., 1996.

"Proceedings of the Advanced Turbine Systems Annual Program Review Meeting", "$NO_X$ and CO Emissions Models for Gas–Fired Lean–Premixed Combustion Turbines", A. Mellor, pp. 111–122, Nov., 1996.

"Proceedings of the Advanced Turbine Systems Annual Program Review Meeting", "Methodologies for Active Mixing and Combustion Control", Uri Vandsburger, pp. 123–156, Nov., 1996.

"Proceedings of the Advanced Turbine Systems Annual Program Review Meeting", "Combustion Modeling in Advanced Gas Turbine Systems", Paul O. Hedman, pp. 157–180, Nov., 19967.

"Proceedings of the Advanced Turbine Systems Annual Program Review Meeting", "Manifold Methods for Methane Combustion", Stephen B. Pope, pp. 181–188, Nov., 1996.

"Proceedings of the Advanced Turbine Systems Annual Program Review Meeting", "The Role of Reactant Unmixedness, Strain Rate, and Length Scale on Premixed Combustor Performance", Scott Samuelsen, pp. 189–210, Nov., 1996.

"Proceedings of the Advanced Turbine Systems Annual Program Review Meeting", "Effect of Swirl and Momentum Distribution on Temperature Distribution in Premixed Flames", Ashwani K. Gupta, p. 211–232, Nov., 1996.

"Proceedings of the Advanced Turbine Systems Annual Program Review Meeting", "Combustion Instability Studies Application to Land–Based Gas Turbine Combustors", Robert J. Santoro, pp. 233–252.

"Proceedings of the Advanced Turbine Systems Annual Program Review Meeting", Active Control of Combustion Instabilities in Low $NO_X$ Turbines, Ben T. Zinn, pp. 253–264, Nov., 1996.

"Proceedings of the Advanced Turbine Systems Annual Program Review Meeting", "Life Prediction of Advanced Materials for Gas Turbine Application," Sam Y. Zamrik, pp. 265–274, Nov., 1996.

"Proceedings of the Advanced Turbine Systems Annual Program Review Meeting", "Combustion Chemical Vapor Deposited Coatings for Thermal Barrier Coating Systems", W. Brent Carter, pp. 275–290, Nov., 1996.

"Proceedings of the Advanced Turbine Systems Annual Program Review Meeting", "Compatibility of Gas Turbine Materials with Steam Cooling", Vimal Desai, pp. 291–314, Nov., 1996.

"Proceedings of the Advanced Turbine Systems Annual Program Review Meeting", "Bond Strength and Stress Measurements in Thermal Barrier Coatings", Maurice Gell, pp. 315–334, Nov., 1996.

"Proceedings of the Advanced Turbine Systems Annual Program Review Meeting", "Advanced Multistage Turbine Blade Aerodynamics, Performance, Cooling and Heat Transfer", Sanford Fleeter, p. 335–356, Nov., 1996.

"Proceedings of the Advanced Turbine Systems Annual Program Review Meeting", "Flow Characteristics of an Intercooler System for Power Generating Gas Turbines", Ajay K. Agrawal, pp. 357–370, Nov., 1996.

"Proceedings of the Advanced Turbine Systems Annual Program Review Meeting", "Improved Modeling Techniques for Turbomachinery Flow Fields", B. Lakshiminarayana, pp. 371–392, Nov., 1996.

"Proceedings of the Advanced Turbine Systems Annual Program Review Meeting", "Development of an Advanced 3d & Viscous Aerodynamic Design Method for Turbomachine Components in Utility and Industrial Gas Turbine Applications", Thong Q. Dang, pp. 393–406, Nov., 1996.

"Proceedings of the Advanced Turbine Systems Annual Program Review Meeting", "Advanced Turbine Cooling, Heat Transfer and Aerodynamic Studies", Je–Chin Han, pp. 407–426, Nov., 1996.

"Proceedings of the Advanced Turbine Systems Annual Program Review Meeting", "Heat Transfer in a Two–Pass Internally Ribbed Turbine Blade Coolant Channel with Vortex Generators", S. Acharya, pp. 427–446.

"Proceedings of the Advanced Turbine Systems Annual Program Review Meeting", "Experimental and Computational Studies of Film Cooling with Compound Angle Injection", R. Goldstein, pp. 447–460, Nov., 1996.

"Proceedings of the Advanced Turbine Systems Annual Program Review Meeting", "Study of Endwall Film Cooling with a Gap Leakage Using a Thermographic Phosphor Fluorescence Imaging System", Mingking K. Chyu, pp. 461–470, Nov., 1996.

"Proceedings of the Advanced Turbine Systems Annual Program Review Meeting", "Steam as a Turbine Blade Coolant: External Side Heat Transfer", Abraham Engeda, pp. 471–482, Nov., 1986.

"Proceedings of the Advanced Turbine Systems Annual Program Review Meeting", "Flow and Heat Transfer in Gas Turbine Disk Cavities Subject to Nonuniform External Pressure Field", Ramendra Roy, pp. 483–498, Nov., 1996.

"Proceedings of the Advanced Turbine Systems Annual Program Review Meeting", "Closed–Loop Mist/Steam Cooling for Advanced Turbine Systems", Ting Wang, pp. 499–512, Nov., 1996.

"Proceedings of the Advanced Turbine Systems Annual Program Review Meeting", "Heat Pipe Turbine Vane Cooling", Langston et al., pp. 513–534, Nov., 1996.

"Proceedings of the Advanced Turbine Systems Annual Program Review Meeting", "EPRI's Combustion Turbine Program: Status and Future Directions", Arthur Cohn, pp. 535,–552 Nov., 1996.

"Proceedings of the Advanced Turbine Systems Annual Program Review Meeting", "ATS Materials Support", Michael Karnitz, pp. 553–576, Nov., 1996.

"Proceedings of the Advanced Turbine Systems Annual Program Review Meeting", "Land Based Turbine Casting Initiative", Boyd A. Mueller, pp. 577–592, Nov., 1996.

"Proceedings of the Advanced Turbine Systems Annual Program Review Meeting", "Turbine Airfoil Manufacturing Technology", Charles S. Kortovich, p. 593–622, Nov., 1996.

"Proceedings of the Advanced Turbine Systems Annual Program Review Meeting", "Hot Corrosion Testing of TBS's", Norman Bornstein, pp. 623–631, Nov., 1996.

"Proceedings of the Advanced Turbine Systems Annual Program Review Meeting", "Ceramic Stationary Gas Turbine", Mark van Roode, pp. 633–658, Nov., 1996.

"Proceedings of the Advanced Turbine Systems Annual Program Review Meeting", "Western European Status of Ceramics for Gas Turbines", Tibor Bornemisza, pp. 659–670, Nov., 1996.

"Proceedings of the Advanced Turbine Systems Annual Program Review Meeting", " Status of Ceramic Gas Turbines in Russia", Mark van Roode, p. 671, Nov., 1996.

"Status Report: The U.S. Department of Energy's Advanced Turbine systems Program", facsimile dated Nov. 7, 1996.

"Testing Program Results Validate GE's H Gas Turbine—High Efficiency, Low Cost of Electricity and Low Emissions", Roger Schonewald and Patrick Marolda, (no date available).

"Testing Program Results Validate GE's H Gas Turbine—High Efficiency, Low Cost of Electricity and Low Emissions", Slide Presentation—working draft, (no date available).

"The Next Step in H . . . For Low Cost Per kW–Hour Power Generation", LP–1 PGE '98.

"Utility Advanced Turbine System (ATS) Technology Readiness Testing and Pre–Commercialization Demonstration", Document #486040, Oct. 1—Dec. 31, 1996, Publication Date, Jun. 1, 1997, Report Nos. DOE/MC/31176—5628.

"Utility Advanced Turbine System (ATS) Technology Readiness Testing—Phase 3", Document #666274, Oct. 1, 1996–Sep. 30, 1997, Publication Date, Dec. 31, 1997, Report Nos.: DOE/MC/31176—10.

"Utility Advanced Turbine System (ATS) Technology Readiness Testing and Pre–Commercial Demonstration, Phase 3", Document #486029, Oct. 1—Dec. 3, 1995, Publication Date, May 1, 1997, Report Nos.: DOE/MC/31176—5340.

"Utility Advanced Turbine System (ATS) Technology Readiness Testing and Pre–Commercial Demonstration—Phase 3", Document #486132, Apr. 1—Jun. 30, 1976, Publication Date, Dec. 31, 1996, Report Nos.: DOE/MC/31176—5660.

"Utility Advanced Turbine System (ATS) Technology Readiness Testing and Pre–Commercial Demonstration—Phase 3", Document #587906, Jul. 1—Sep. 30, 1995, Publication Date, Dec. 31, 1995, Report Nos.: DOE/MC/31176—5339.

"Utility Advanced Turbine System (ATS) Technology Readiness Testing and Pre–Commercial Demonstration" Document #666277, Apr. 1—Jun. 30, 1997, Publication Date, Dec. 31, 1997, Report Nos.: DOE/MC/31176—8.

"Utility Advanced Turbine System (ATS) Technology Readiness Testing and Pre–Commercialization Demonstration" Jan. 1—Mar. 31, 1996, DOE/MC/31176—5338.

"Utility Advanced Turbine System (ATS) Technology Readiness Testing: Phase 3R", Document #756552, Apr. 1—Jun. 30, 1999, Publication Date, Sep. 1, 1999, Report Nos.: DE—FC21–95MC31176–23.

"Utility Advanced Turbine System (ATS) Technology Readiness Testing.", Document #656823, Jan. 1—Mar. 31, 1998, Publication Date, Aug. 1, 1998, Report Nos.: DOE/MC/31176–17.

"Utility Advanced Turbine Systems (ATS) Technology Readiness Testing and Pre–Commercial Demonstration", Annual Technical Progress Report, Reporting Period: Jul. 1, 1995–Sep. 30, 1996.

"Utility Advanced Turbine Systems (ATS) Technology Readiness Testing", Phase 3R, Annual Technical Progress Report, Reporting Period: Oct. 1, 1997—Sep. 30, 1998.

"Utility Advanced Turbine Systems (ATS) Technology Readiness Testing", Document #750405, Oct. 1—Dec. 30, 1998, Publication Date: May, 1, 1999, Report Nos.: DE–FC21–95MC31176–20.

"Utility Advanced Turbine Systems (ATS) Technology Readiness Testing", Document #1348, Apr. 1—Jun. 29, 1998, Publication Date Oct. 29, 1998, Report Nos. DE–FC21–95MC31176—18.

"Utility Advanced Turbine Systems (ATS) Technology Readiness Testing—Phase 3", Annual Technical Progress Report, Reporting Period: Oct. 1, 1996—Sep. 30, 1997.

"Utility Advanced Turbine Systems (ATS) Technology Readiness Testing and Pre–Commercial Demonstration", Quarterly Report, Jan. 1—Mar. 31, 1997, Document #666275, Report Nos.: DOE/MC/31176-07.

"Proceedings of the 1997 Advanced Turbine Systems", Annual Program Review Meeting, Oct. 28–29, 1997.

* cited by examiner

Fig. 3

| Fig. 3A | Fig. 3B | Fig. 3C | Fig. 3D |

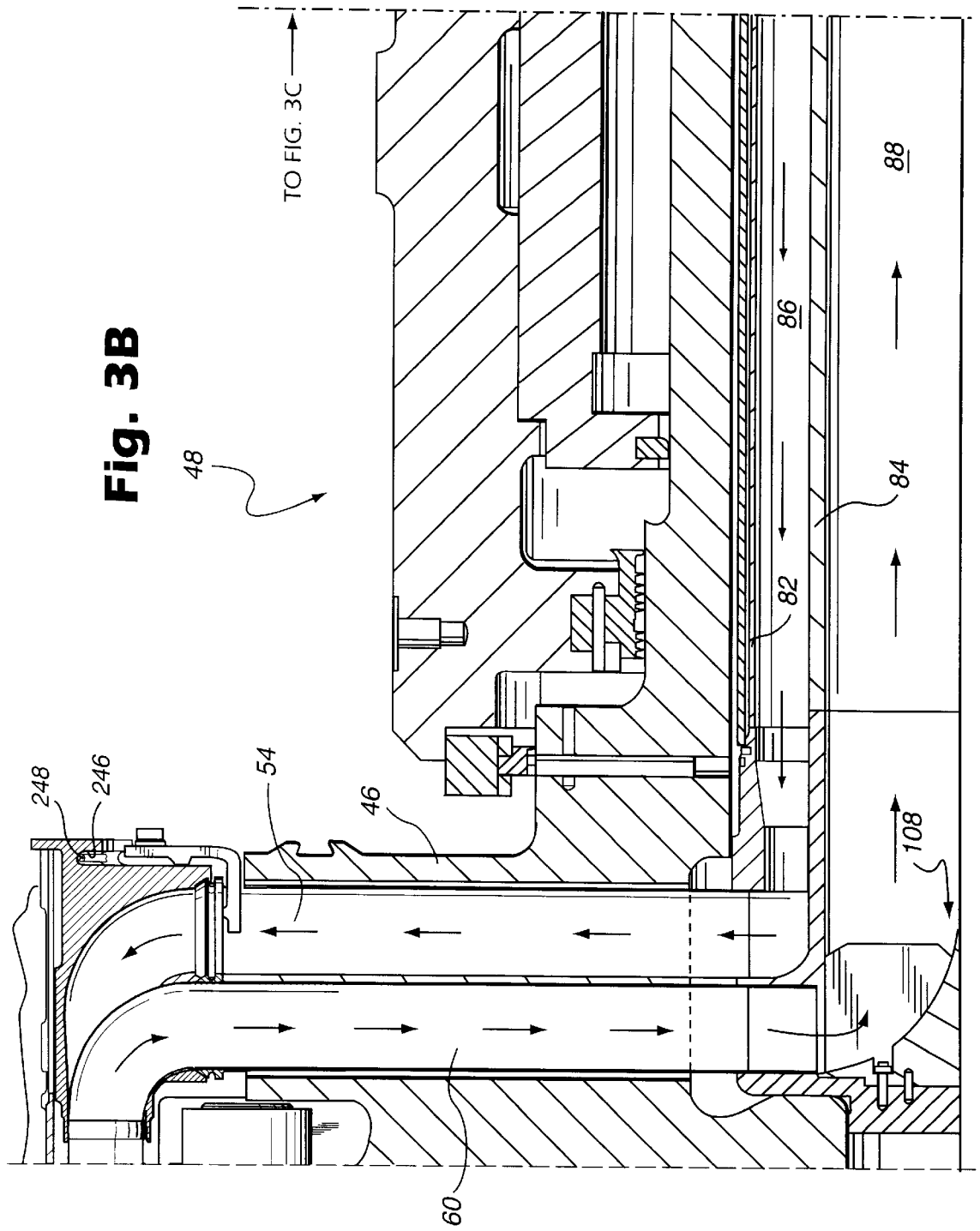

STEAM COOLING SYSTEM FOR A GAS TURBINE

This application is a continuation of application Ser. No. 09/379,580, filed Aug. 24, 1999, the entire content of which is hereby incorporated by reference in this application.

This invention was made with Government support under Contract No. DE-FC21-95MC31176 awarded by the Department of Energy. The Government has certain rights in this invention.

BACKGROUND OF THE INVENTION

The present invention relates generally to turbines and particularly to land-based gas turbines for power generation employing closed-circuit steam cooling paths for cooling the hot gas components and returning the spent cooling steam to a return, for example, a heat recovery steam generator used in a combined cycle system.

Steam cooling of hot gas path components, for example, the buckets of a gas turbine, has been proposed in the past and found efficacious in land-based power generating plants. While gas turbines are typically air-cooled, for example, jet engines employ compressor discharge air for cooling the hot gas components, steam cooling is more efficient in that the losses associated with the use of steam as a coolant are not as great as the losses realized by extracting compressor bleed air for cooling purposes. Also, in combined cycle operations, steam cooling is particularly advantageous because the heat energy imparted to the steam as it cools the gas turbine components is recovered as useful work in driving the steam turbine in the combined cycle operation.

In U.S. Pat. No. 5,593,274, of common assignee herewith, there is disclosed a gas turbine having coaxial steam passages for supplying cooling steam to hot gas components of the rotor, for example, the buckets, and returning the spent cooling steam to a return. Various refinements and improvements, however, in the supply and return of the steam for cooling purposes are provided by the present invention.

BRIEF SUMMARY OF THE INVENTION

The present invention provides a closed-circuit steam cooling system for cooling the hot gas path components of the gas turbine rotor and returning the spent cooling steam to a return. In general, the system includes a bore tube assembly for receiving cooling steam from a cooling inlet scroll for passage generally along the axis of the gas turbine rotor. The supplied cooling steam is turned in a generally radial direction for flow through tubes in an aft shaft disk for conveying the cooling steam adjacent the rim of the rotor. The cooling steam is supplied axially along the rim of the rotor by a plurality of supply passages or tubes extending through openings in the stacked wheels and spacers forming the gas turbine rotor. Each supply passage or tube supplies cooling steam to a supply manifold segment, a plurality of which segments are circumferentially spaced one from the other about the rotor. Each supply manifold segment includes a plurality of exit ports and supply passageways for supplying cooling steam to each of first and second buckets of respective turbine wheels, preferably of the first and second stages of the gas turbine for cooling the buckets. Spent cooling steam is returned from the buckets via return passageways and inlet ports to a plurality of return manifold segments circumferentially spaced one from the other about the rim of the rotor. The return manifold segments are each connected to an axial return tube extending along the rim of the rotor to the aft shaft disk. The spent cooling steam flowing axially along the return tubes is supplied to radial tubes extending in the aft disk for return to the bore tube assembly and exit to a return, for example, a heat recovery steam generator of a combined cycle system.

Various aspects of the generally aforedescribed cooling steam system are of particular significance. For example, the flow of the supply and return thermal medium changes between radial and axial directions at the rim of the rotor. Elbows of novel configuration and use are provided in radial opening slots in the aft disk in communication with the axial and radial tubes for changing the direction of flow. For example, elbows are provided interconnecting the radial supply tubes for turning the flow of the supply steam from radial directions into an axial direction in communication with the steam supply tubes along the rim of the rotor. Likewise, elbows interconnect the axial return tubes with the radial tubes for changing the direction of flow of the spent cooling medium from an axial direction to radial directions. The elbows are preferably integrally cast parts readily assembled into the slots of the aft disk.

In another aspect of the present invention, the cooling steam supply and spent cooling steam return manifolds are each provided in circumferentially spaced manifold segments. The supply and return manifold segments are also axially spaced from one another. Each manifold lies in communication with the buckets of a pair of wheels. For example, each supply manifold segment lies in communication with certain buckets of adjacent wheels on opposite axial sides thereof. Likewise, the return manifold segments receive spent cooling steam from certain buckets which also lie on opposite sides of the return manifold segments. Spoolies are used to interconnect the supply and return manifold segments with the various passages in the buckets. Various other aspects of the present invention will become more apparent upon reference to the following specification and drawings.

In a preferred embodiment according to the present invention, there is provided in a turbine rotor having axially spaced wheels mounting buckets, and spacers between the wheels, a cooling system for cooling the buckets, comprising a plurality of cooling medium supply passages circumferentially spaced from one another about and adjacent a rim of the rotor, a plurality of spent cooling medium return passages circumferentially spaced from one another about and adjacent the rim of the rotor, a plurality of supply manifold segments circumferentially spaced from one another about and adjacent the rim of the rotor, each supply manifold lying in communication with at least one of the supply passages for receiving the cooling medium, each supply manifold segment having a plurality of supply ports connecting the supply manifold segment and cooling medium inlets for the turbine buckets of the axially spaced wheels and a plurality of return manifold segments circumferentially spaced from one another about and adjacent a rim of the rotor, each return manifold segment lying in communication with at least of one of the return passages for receiving spent cooling medium, each return manifold segment having a plurality of return ports connecting the return manifold segment and spent cooling medium outlets for the turbine buckets of the axially spaced wheels.

In a further preferred embodiment according to the present invention, there is provided in a turbine rotor having axially spaced wheels mounting buckets, and spacers between the wheels, a cooling system for cooling the buckets, comprising a plurality of generally axially extending cooling medium supply passages circumferentially spaced from one another about and adjacent a rim of the rotor, a plurality of generally axially extending spent cooling medium return passages circumferentially spaced from one another about and adjacent the rim of the rotor, first and second sets of a plurality each of generally radially extending passages for respectively supplying the cooling medium to the cooling medium axial supply passages and returning the spent cooling medium from the spent cooling medium axial return passages, an aft disk forming part of the rotor and having axial extending slots about a periphery thereof and a plurality of flow turning elements disposed in the slots interconnecting the axial and radially extending passages and having passageways for turning flow between generally axial and radial directions.

In a still further preferred embodiment according to the present invention, there is provided in a turbine rotor having axially spaced wheels mounting buckets, and spacers between the wheels, a cooling system for the buckets comprising a plurality of generally axially extending cooling medium conveying passages circumferentially spaced from one another about and adjacent a rim of the rotor and lying in communication with the buckets, a plurality of generally radially extending passages in communication with the axial passages for conveying the thermal medium, an aft disk forming part of the rotor and having axially extending slots about a periphery thereof and a plurality of flow turning elements disposed in the slots interconnecting the axial and radial extending passages and having passageways for turning flow between generally axial and radial directions.

In a still further preferred embodiment according to the present invention, there is provided in a turbine rotor having axially spaced wheels mounting buckets, and spacers between the wheels, a cooling system for cooling the buckets, comprising a cooling medium supply passage extending generally axially along the rotor, a cooling medium return passage extending axially along the rotor, a supply manifold adjacent the rim of the rotor in communication with the supply passage for receiving the cooling medium, the supply manifold having a plurality of supply ports connecting the supply manifold and cooling medium inlets for the turbine buckets of the axially spaced wheels and a return manifold adjacent a rim of the rotor in communication with the return passage for receiving spent cooling medium, the return manifold having a plurality of return ports connecting the return manifold and spent cooling medium outlets for the turbine buckets of the axially spaced wheels and thin-walled spoolies having spherical end portions disposed between (i) the supply manifold and the cooling medium inlets and (ii) the return manifold and the spent cooling medium outlets.

BRIEF DESCRIPTION OF THE DRAWINGS

FIG. 3 is a block diagram illustrating the relationship of FIGS. 3A, 3B, 3C and 3D;

FIG. 3B is an enlarged cross-sectional view of an aft portion of the rotor adjacent its rim illustrating the radial supply and return tubes and their communication with a bore tube assembly;

DETAILED DESCRIPTION OF THE INVENTION

Figure 1:
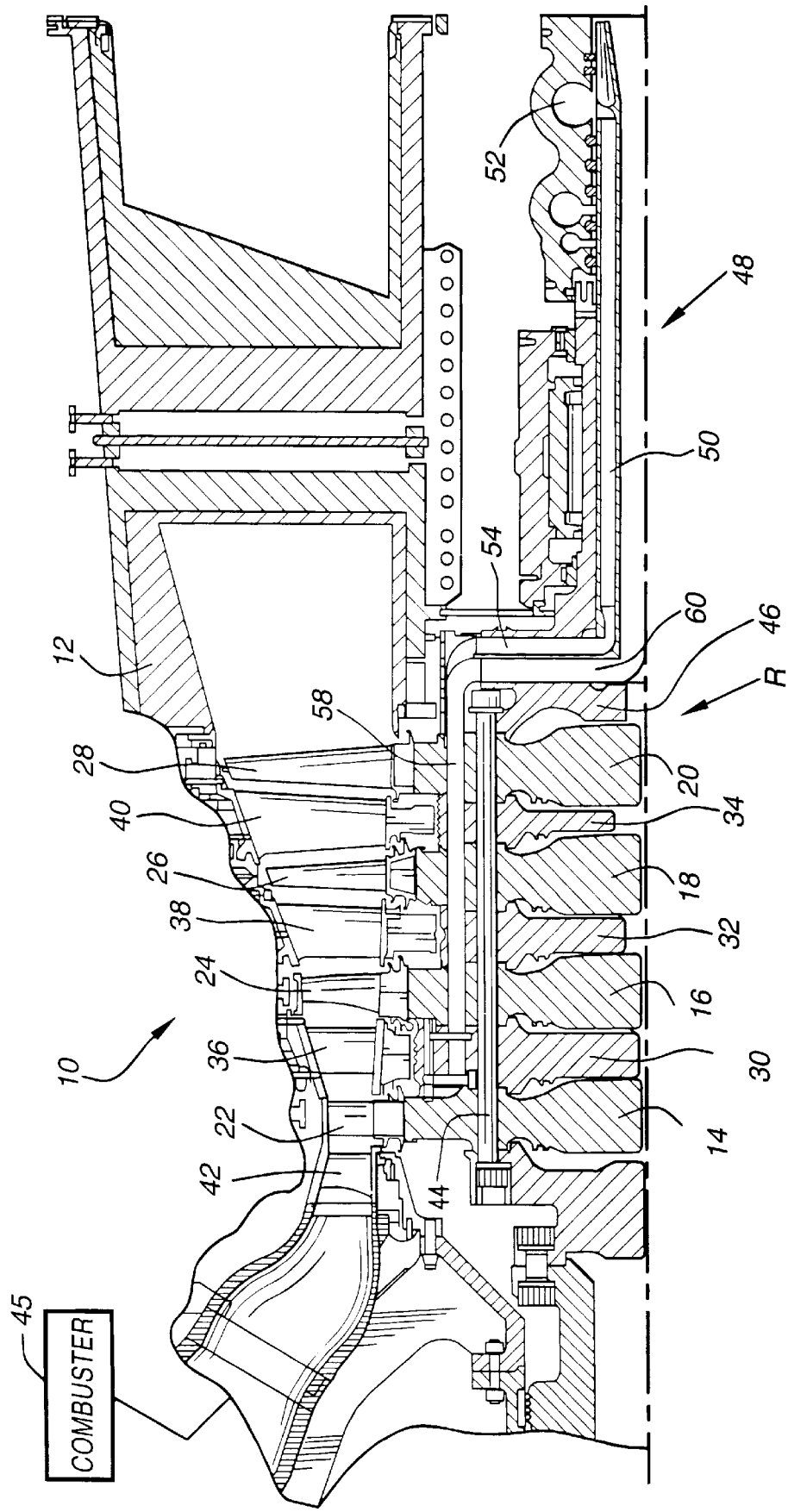
FIG. 1 is a cross-sectional view of a portion of a gas turbine illustrating a turbine section thereof incorporating portions of a cooling system according to a preferred embodiment of the present invention.

Referring to FIG. 1, there is illustrated a turbine section, generally designated 10, incorporating a preferred embodiment of the present invention. The turbine section 10 includes a turbine housing 12 surrounding a turbine rotor R. Rotor R includes in the present example four successive stages comprising wheels 14, 16, 18 and 20, carrying a plurality of circumferentially spaced buckets or blades 22, 24, 26 and 28, respectively. The wheels are arranged alternately between spacers 30, 32 and 34. The outer rims of spacers 30, 32 and 34 lie in radial registration with a plurality of stator blades or nozzles 36, 38 and 40, with the first set of nozzles 42 lying forwardly of the first buckets 22. Consequently, it will be appreciated that a four-stage turbine is illustrated wherein the first stage comprises nozzles 42 and buckets 22; the second stage, nozzles 36 and buckets 24; the third stage, nozzles 38 and buckets 26 and, finally, the fourth stage, nozzles 40 and buckets 28. The rotor wheels and spacers are secured one to the other by a plurality of circumferentially spaced bolts 44 passing through aligned openings in the wheels and spacers. A plurality of combustors, one being schematically illustrated at 45, are arranged about the turbine section to provide hot gases of combustion through the hot gas path of the turbine section comprising the nozzles and buckets for rotating the rotor. The rotor also includes an aft disk 46 formed integrally with a bore tube assembly, generally designated 48 defining an aft shaft.

Figure 2:
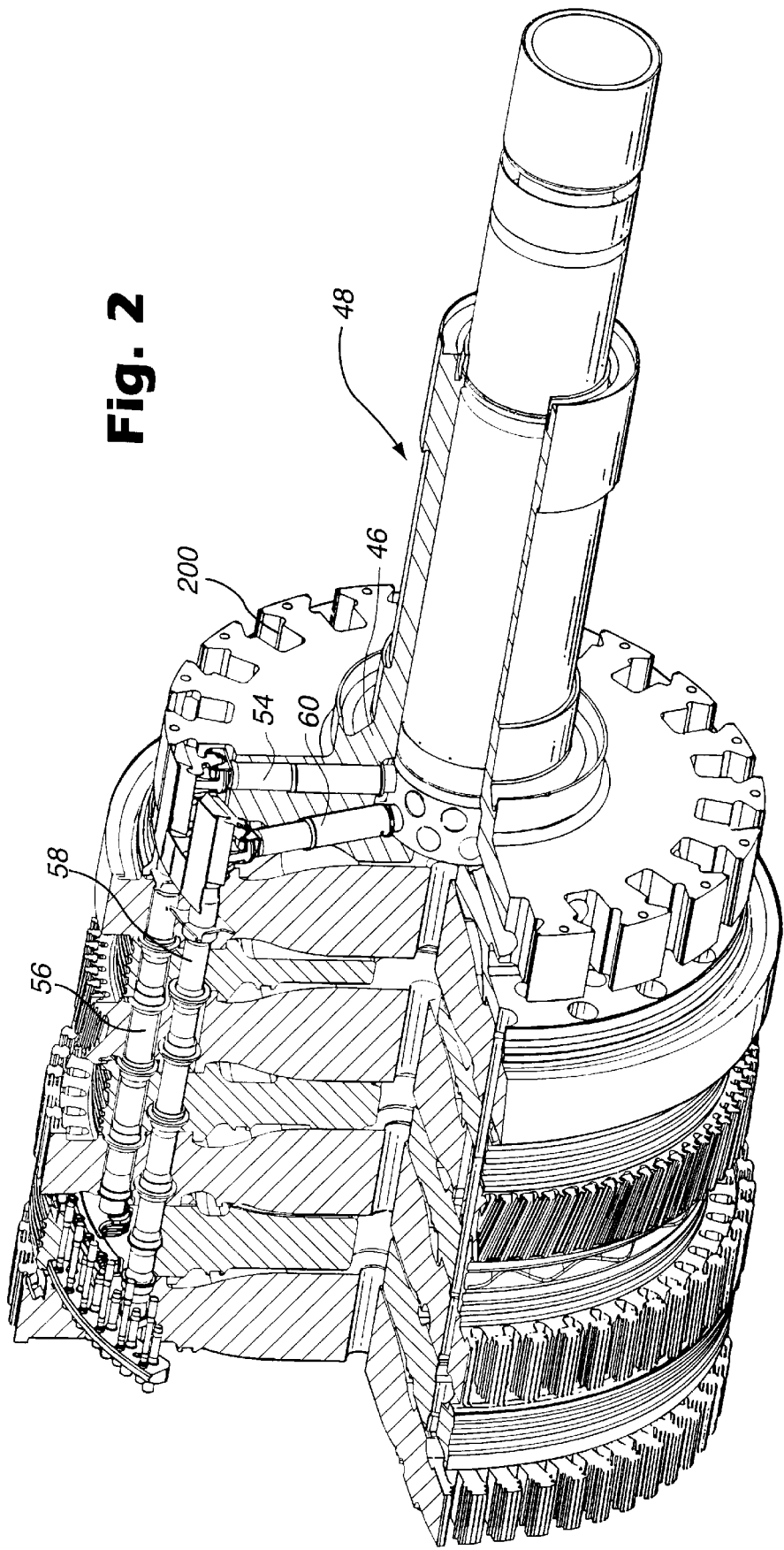
FIG. 2 is a fragmentary perspective view of portions of a turbine rotor with parts broken out and in cross-section for ease of illustration.

At least one and preferably both sets of buckets 22 and 24 preferably of the first two stages are provided with a thermal medium for cooling, the thermal medium preferably being cooling steam. Cooling steam is supplied and returned through the bore tube assembly 48. With reference to FIGS. 1 and 2 and in a preferred embodiment, the bore tube assembly 48 includes an annular passage 50 supplied with cooling steam, from a steam plenum 52 for flow to a plurality of radially extending tubes 54 provided in the aft disk 46. Tubes 54 communicate with circumferentially spaced, axially extending thermal medium supply tubes 56 in communication with cooling passages in the first and second-stage buckets. Spent or returned cooling steam at an elevated temperature flows from the first and second-stage buckets through a plurality of circumferentially spaced, axially extending return tubes 58. Return tubes 58 communicate at their aft ends with radially inwardly extending return tubes 60 in aft disk 46. From tubes 60, the spent steam flows into the central bore 88 of the bore tube assembly 48 for return to a supply or for flow to a heat recovery steam generator for use in a combined-cycle system.

Figure 3A:
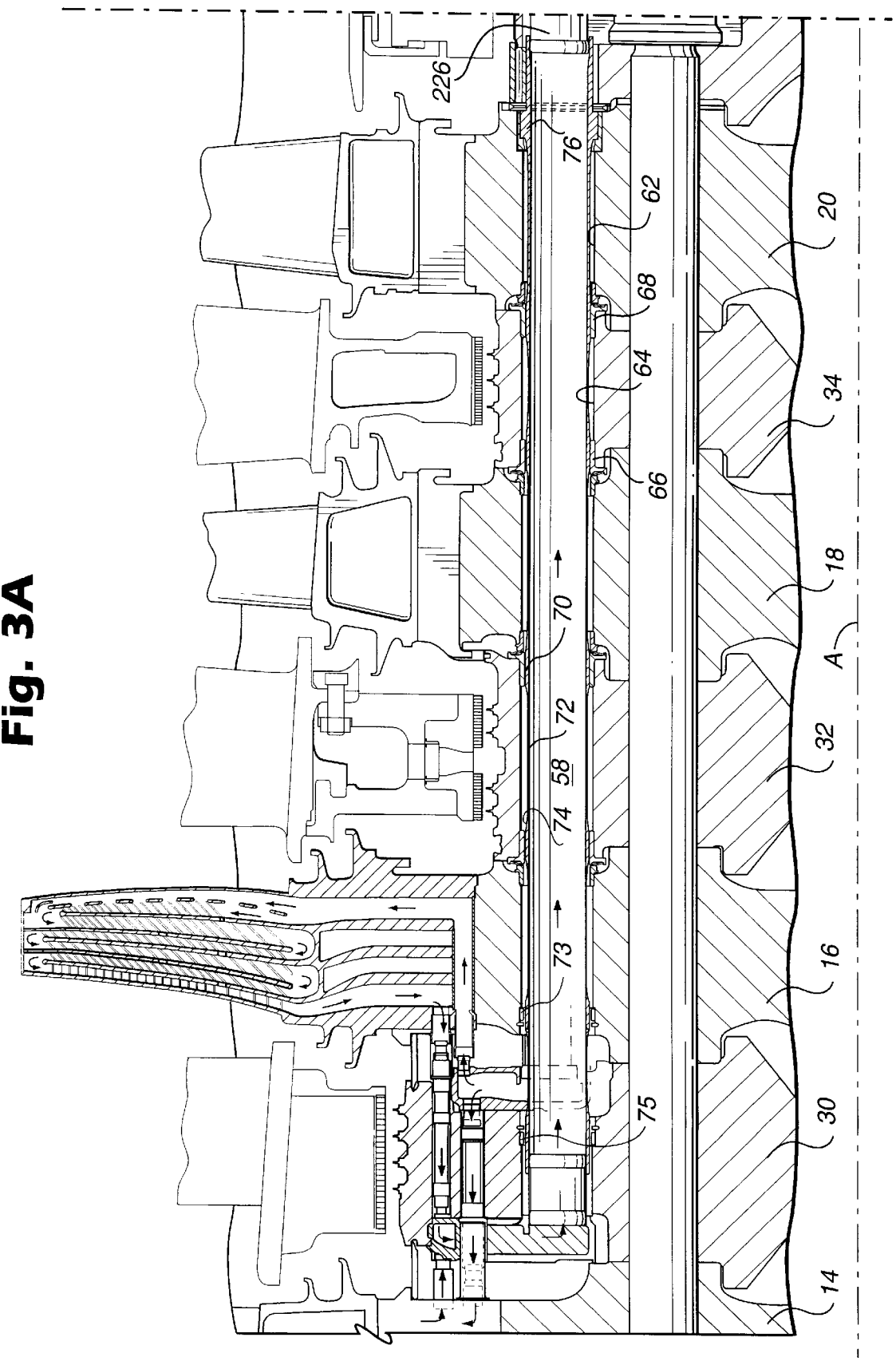
FIG. 3A is a fragmentary cross-sectional view illustrating a rim of the rotor with the thermal medium return tube being illustrated.

It will be appreciated from the foregoing description that the axially extending supply and return tubes 56 and 58, respectively, lie adjacent the rim of and circumferentially about the rotor, with each supply and return tube extending through axially aligned openings through the axially stacked wheels and spacers. For example, the aligned openings 62 and 64 of wheel 20 and spacer 34, respectively, of the fourth stage are illustrated in FIG. 3A. Similar aligned openings are provided in the wheels and spacers of the first, second and third stages.

As illustrated in FIG. 3A, bushings are provided at various locations within the openings of the wheels and spacers for supporting the cooling medium supply and return tubes 56 and 58, respectively. For example, bushings 66 and 68 are disposed adjacent opposite ends of the opening 64 through spacer 34. Similar bushings are disposed at opposite ends of the third-stage spacer 32. Bushings 73 and 75 are provided at the forward opening of wheel 16 and the aft opening of spacer 30, respectively. Similar bushings are provided in the aligned openings for the supply tube.

Referring to FIG. 3A, a return tube 58 is specifically illustrated. It will be appreciated, however, that the supply and return tubes spaced about the rim of the rotor are similar in aspects relevant to this invention and a description of one will suffice as a description of the other, except as otherwise noted. Moreover, the supply and return tubes 56 and 58 having centers at equal radii from the rotor axis A (FIG. 3A) and are equally spaced circumferentially from one another. Each tube comprises a thin-walled structure having a plurality of raised lands 70 at axially spaced locations along the length of the tube. The axial locations of the lands 70 coincide with locations of the bushings in the openings through the wheels and spacers. Between the lands 70 are thin-walled tube sections 72. It will be appreciated that the outer exterior surfaces of the lands 70 are radially outwardly of the exterior surfaces of the thin-walled sections 72. Transition sections 74 are provided between each land 70 and adjacent thin-walled sections 72. Transition sections have arcuate outer surfaces transitioning radially inwardly from the outer surface of the lands to the outer surfaces of the thin-walled sections. An enlarged land or flange 76 is provided adjacent aft portions of each tube. For a more detailed description of the supply and return tubes, the manner of their retention within the rotor and seals therefor, reference is made to U.S. patent applications Ser. Nos. 09/334,187; 09/304,202; and 09/332,330, filed Jun. 16, 1999; May 3, 1999 and Jun. 14, 1999, respectively, the disclosures of which are incorporated herein by reference).

Figure 3C:
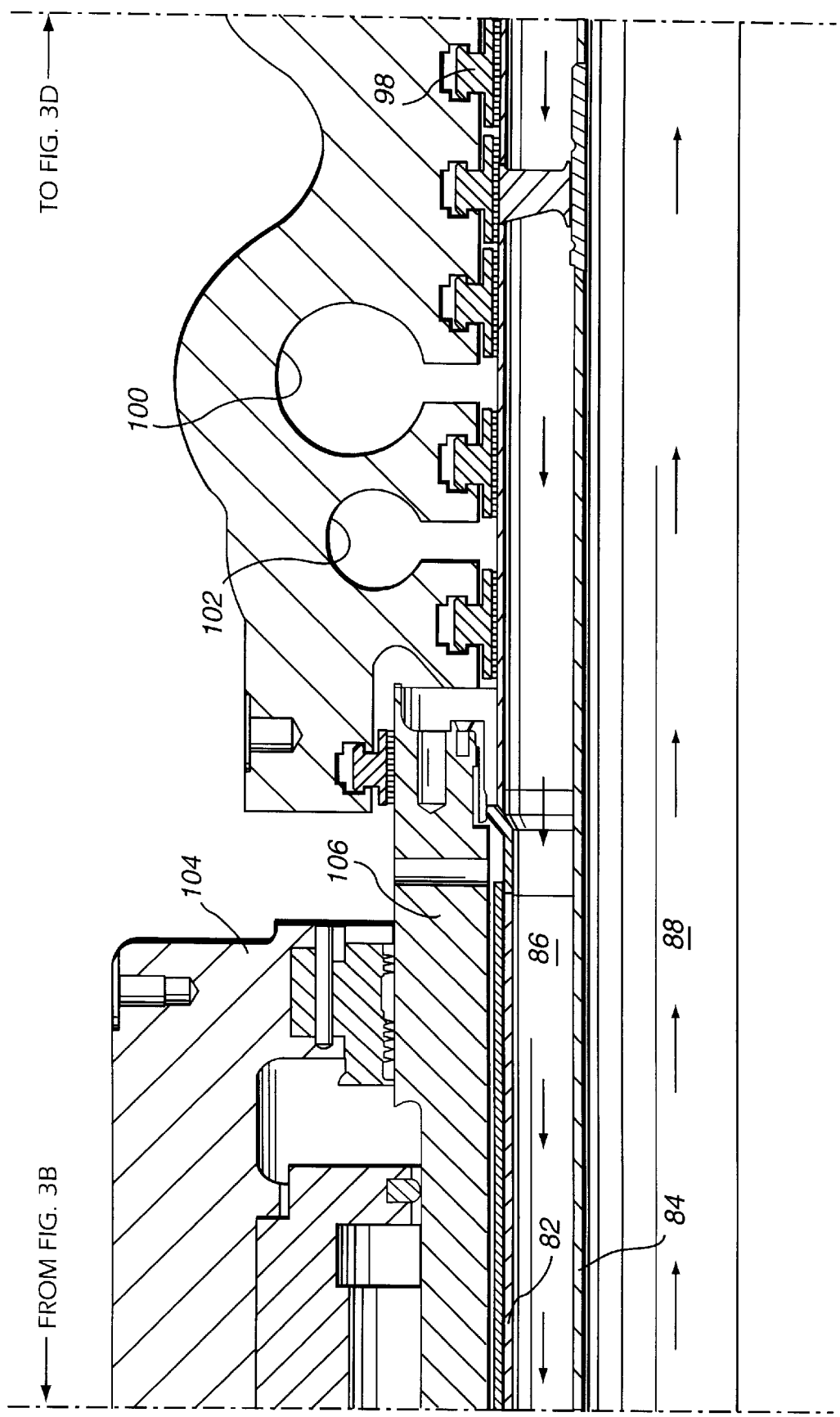
FIG. 3C is an enlarged cross-sectional view forming a continuation of the bore tube assembly illustrated in FIG. 3B.
Figure 3D:
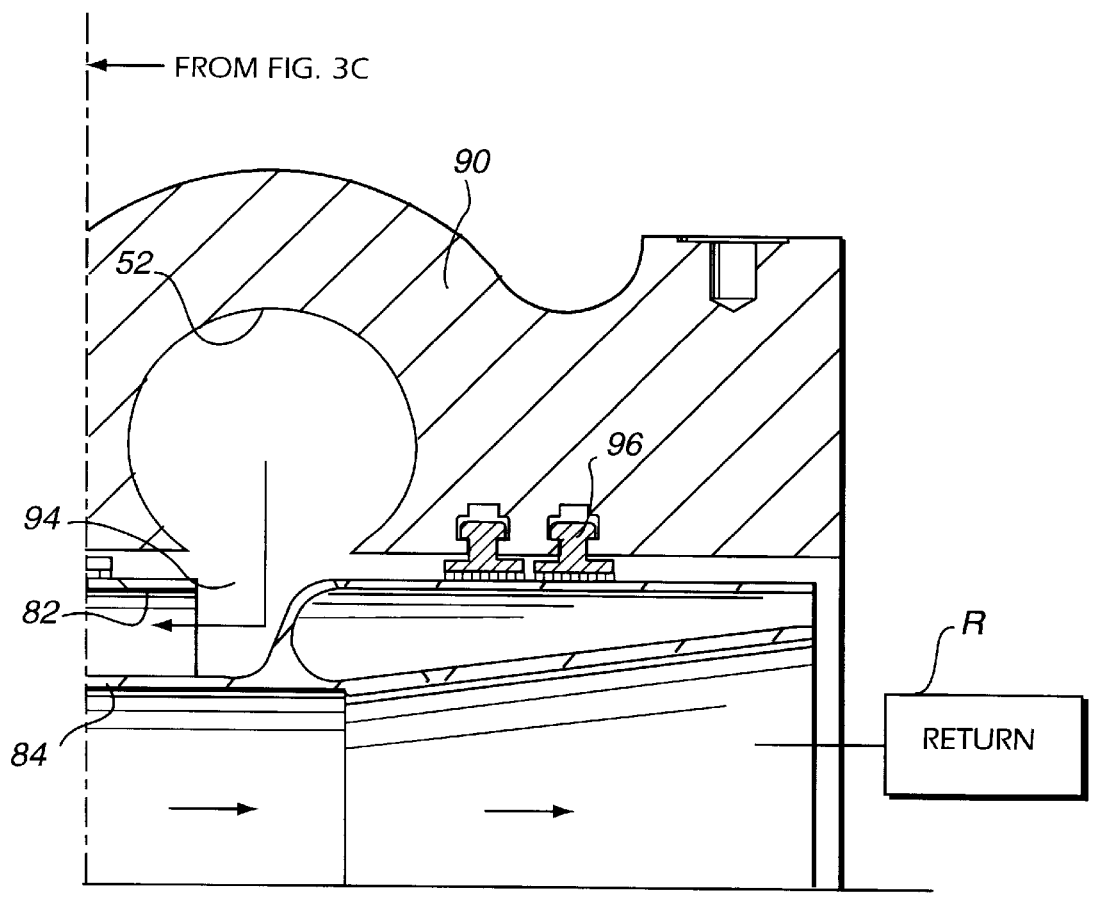
FIG. 3D is an enlarged cross-sectional view of the aft end of the bore tube assembly.

Referring now particularly to FIGS. 3B–3D, a bore tube assembly 48 forms part of the rotor and is mounted for rotation about the rotor axis A. The bore tube assembly 48 includes the aft disk 46 and provides a flow of cooling medium, for example, steam, to the turbine buckets and a passage for flow of the spent cooling medium to a return. As noted previously, the cooling system may be provided as part of a closed-circuit steam cooling supply and return system in a combined cycle system, i.e., split off from a high pressure steam turbine exhaust, or may be supplied from an existing in-plant supply. The bore tube assembly 48 includes an outer tube 82 and an inner tube 84 concentric with outer tube 82 about the axis of rotation of the rotor shaft. The outer and inner tubes 82 and 84, respectively, define an annular cooling steam supply passage 86, while the inner tube 84 provides a spent cooling steam passage 88. Referring particularly to FIG. 3C, a steam gland 90 is disposed about the bore tube assembly 48 and defines plenum 52. It will be appreciated that the steam gland 90 is fixed and the bore tube assembly 48 rotates about the shaft axis A. The steam plenum 52 is connected to a supply of steam from a suitable source, not shown, and lies in communication with a steam inlet 94 formed through the outer tube 82 for supplying cooling steam to the passage 86 between the outer and inner tubes 82 and 84, respectively. Referring to FIG. 3C, labyrinth-type seals 96 and 98, preferably spring-biased, are provided on opposite sides of the steam gland 90 for sealing about the outer tube 82. A variation on this design may employ brush seals instead of labyrinth seals or combined labyrinth seals and brush seals. The aft end of the steam gland 90 is connected with a stationary steam pipe schematically illustrated by return R for receiving spent cooling steam. The steam gland also includes leakage steam plenums 100 and 102 for collecting steam leaking past the labyrinth seals such that the steam will not flow outwardly to the aft main bearing 104 (FIG. 3C). The bearing 104 is a conventional bearing and includes the aft shaft 106 which is integral with the aft disk 46. Thus, the shaft 106 is rotatable with the bore tube assembly 80.

Referring to FIG. 3B, the forward end of the bore tube assembly 48 includes an end cap assembly, generally designated 108. The end cap 108 includes passageways for communicating the thermal medium from the thermal medium supply passage 86 to the radial tubes 54 and returning the spent cooling steam from the radial return tubes 60 to the return passage 88. For a detailed description of the end cap assembly 108, reference is made to U.S. patent application Ser. No. 09/216,363, filed Dec. 18, 1998, the disclosure of which is incorporated herein by reference.

Figure 4:
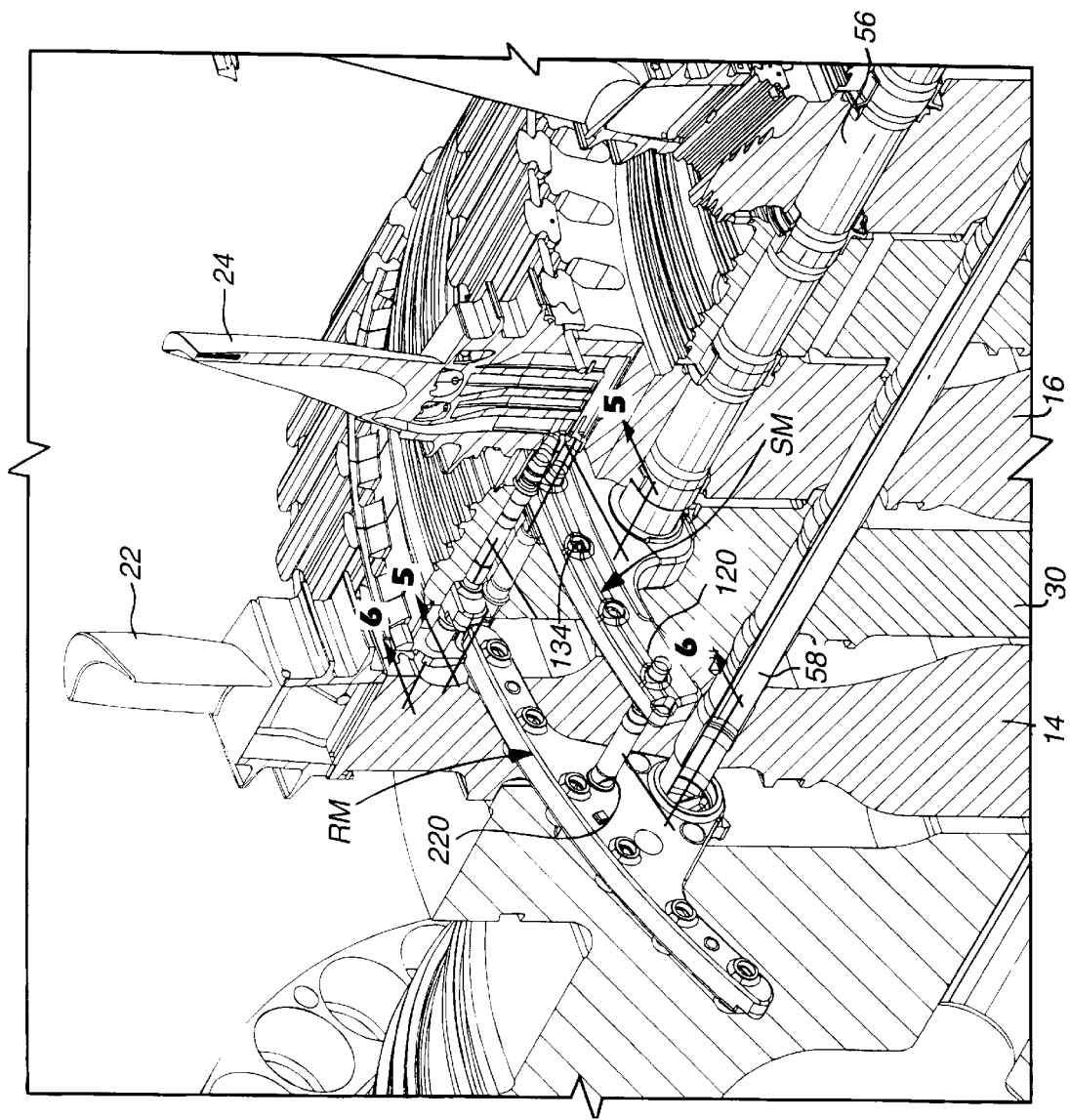
FIG. 4 is a fragmentary perspective view with parts broken out and in cross-section illustrating the supply and return tubes interconnected with supply and return manifold segments, respectively.
Figure 5:
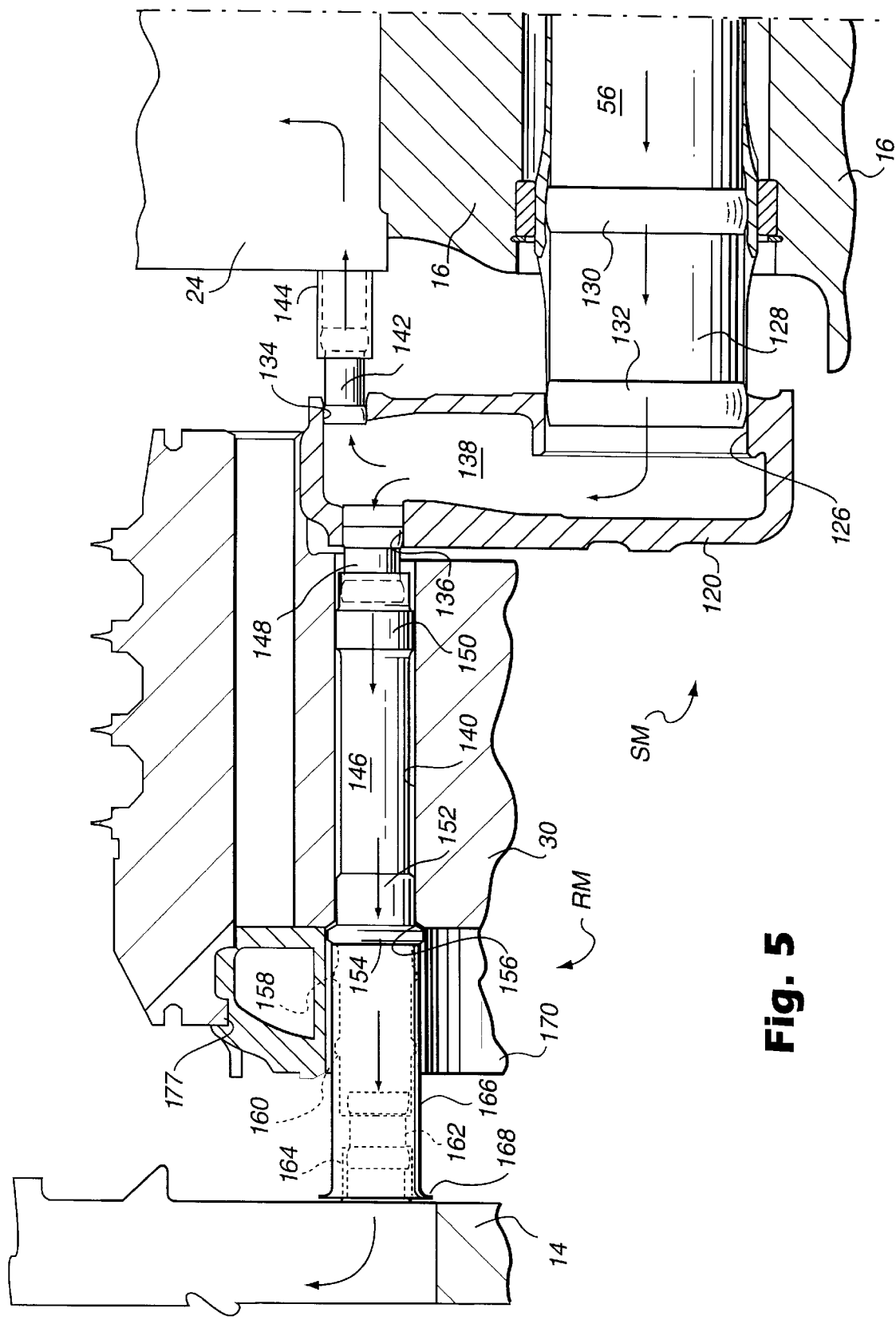
FIG. 5 is an enlarged fragmentary cross-sectional view illustrating a supply manifold segment and various passages communicating the cooling medium to the buckets of adjacent wheels and taken generally about on line 5—5 of FIG. 4.
Figure 9:
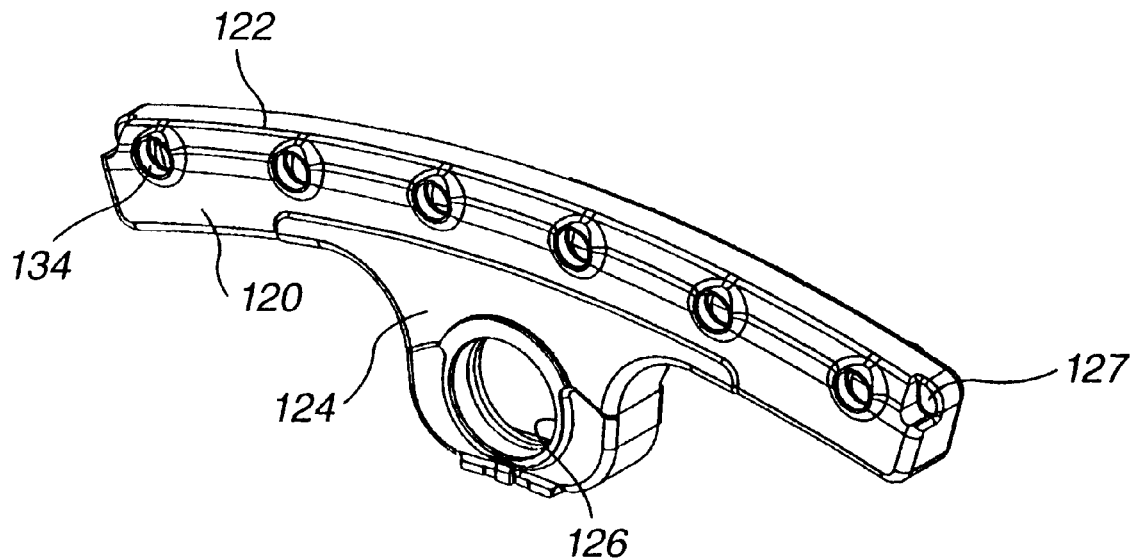

Referring now to FIGS. 4 and 5, it will be appreciated that each of the cooling medium supply tubes 56 supply cooling medium to a manifold, generally designated SM. Manifold SM comprises a plurality of circumferentially spaced supply manifold segments 120 (FIG. 9), preferably located between the aft face of the spacer 30 and the forward face of the second-stage wheel 16. A segment 120 is provided for each supply tube 56 and includes an arcuate rim 122 (FIG. 9) having a depending central and radially inwardly extending projection 124. Projection 124 has an inlet port 126 opening in an axially aft direction for connection with the cooling medium supply tube 56. More particularly, and with reference to FIG. 5, a spoolie 128 interconnects the forward end of a cooling medium supply tube 56 and the inlet port 126. The spoolie comprises a short tube having spherical-shaped end portions. For example, the spoolie 128 has a spherical-shaped end portion 130 for engaging an annular interior surface at the end of the cooling supply medium tube 56. Similarly, the opposite end of spoolie 128 has a spherically-shaped end portion 132 for engaging an annular interior surface of inlet port 126 of manifold segment 120. The spherical shape of the ends of all of the spoolies disclosed herein accommodate relative movement between the spoolie and the associated connected part or passage. In this particular instance, movement between each spoolie 128, the supply tube 56 and manifold segment 120 due to thermal expansion in an axial direction, as well as centrifugal loads, is accommodated.

The manifold 120 also includes a plurality of exit ports 134 and 136 along respective axial end faces thereof in communication with the plenum 138 (FIG. 5) within manifold segment 120. In the present example, the manifold segment 120 has six exit ports 134 opening in an axially aft direction for supplying cooling medium to the buckets of the adjacent wheel, e.g., the buckets of the second-stage wheel 16. Additionally, the manifold segment 120 includes six exit ports 136 (FIG. 5) opening in an axially forward direction. Each exit port 136 registers axially with a passage 140 through the spacer 30 between the first and second-stage wheels 14 and 16.

More particularly, a spoolie 142 is disposed between each of the aft exit ports 134 and a forward integral extension 144 of the bucket 24 of the wheel 16. The integral extension 144 is preferably integrally cast with the bucket and forms a cooling medium inlet for a second-stage bucket. It has been found that the extensions 144 can be provided at less cost if integrally cast in solid block form with the bucket dovetail castings. After the extension block is cast, it is machined, i.e., drilled to provide the axial entry openings to accommodate the spoolies 142. Such initial integral casting in block form provides improved tolerance of true position of the openings in the bucket dovetail. It will be appreciated, however, that a separate hollow tube could be brazed into a pre-drilled hole in the bucket dovetail to accommodate the spoolie 142. The spoolie 142 is of a type similar to spoolie 128, i.e., having spherical end portions for seating in portions of the exit port 134 and extension 144.

Each of the passages 140 is provided with a supply crossover tube 146 which communicates with the axially forward facing exit port 136 from supply manifold segment 120 by way of a further spoolie 148. Thus, the aft end of each crossover tube 146 has an annular seat for receiving the forward spherical portion of the spoolie 148 while the exit ports 136 likewise each have an annular seat for receiving the aft spherical portion of the spoolie 148. As illustrated in FIG. 5, each crossover tube 146 has a diametrically enlarged land 150 adjacent an aft end thereof and a diametrically enlarged land 152 intermediate the length of the crossover tube. Each crossover tube 146 also includes a radially enlarged flange 154 at the forward end of enlarged portion 152 for seating against a chamfer 156 at the forward end of opening 140 through spacer 30. Each crossover tube 146 extends forwardly toward the first-stage wheel 14 and additionally has a pair of axially spaced flanges 158 and 160, forming retention sleeve standoffs on a cantilevered forward end portion of tube 146. The forward end of crossover tube 146 is connected to a spoolie 162 which, in turn, is connected at its opposite end to an aft extension 164 of a bucket of the first-stage wheel. Extension 164 thus forms a cooling medium inlet for a first-stage bucket. Crossover tube 146 is fixed against axial movement in the aft direction, i.e., from left to right in FIG. 5, by engagement of the flange 154 against the face of spacer 30. Each aft extension 164 of each bucket of the first-stage wheel is preferably integrally cast with the bucket dovetail in block form with machined axial openings similarly as extensions 144.

Retention sleeves 166 overlies the flanges 158 and 160 of crossover tubes 146 and each sleeve 166 has its aft end in engagement against flange 154. The opposite end of each retention tube is flared outwardly at 168 and is spaced a limited distance from the aft face of the bucket of the first stage to accommodate axial expansion of the crossover tube 146. For details of the crossover tube and retention sleeve, reference is made to co-pending application Ser. No. 09/312,334, filed May 14, 1999, the disclosure of which is incorporated herein by reference.

The supply manifold also includes recesses 127 (FIG. 9) at the tips of the wings of the manifold and along the aft face thereof. Circumferentially spaced, radially inwardly directed flanges on the aft face of the spacer 30 engage in the recesses to retain the supply manifold in position together with its connection with the supply tube.

To recapitulate, the circumferentially spaced, axially extending cooling medium supply tubes 56 supply cooling medium, preferably steam, to the plenums 138 of the supply manifold segments 120 arranged circumferentially about the rotor. The cooling medium flows through the exit ports 134 in an axially aft direction for supplying cooling medium to the buckets 24 of the second-stage wheel 16. The cooling medium is also supplied via the exit ports 136 in an axially forward direction for flow through the crossover tubes 146 and into the buckets 22 of the first-stage wheel 14. The flow within the buckets of the first and second-stage wheels forms no part of the present invention, although the flow path through a bucket 24 of the second-stage is illustrated in FIGS. 3A and 4.

Figure 6:
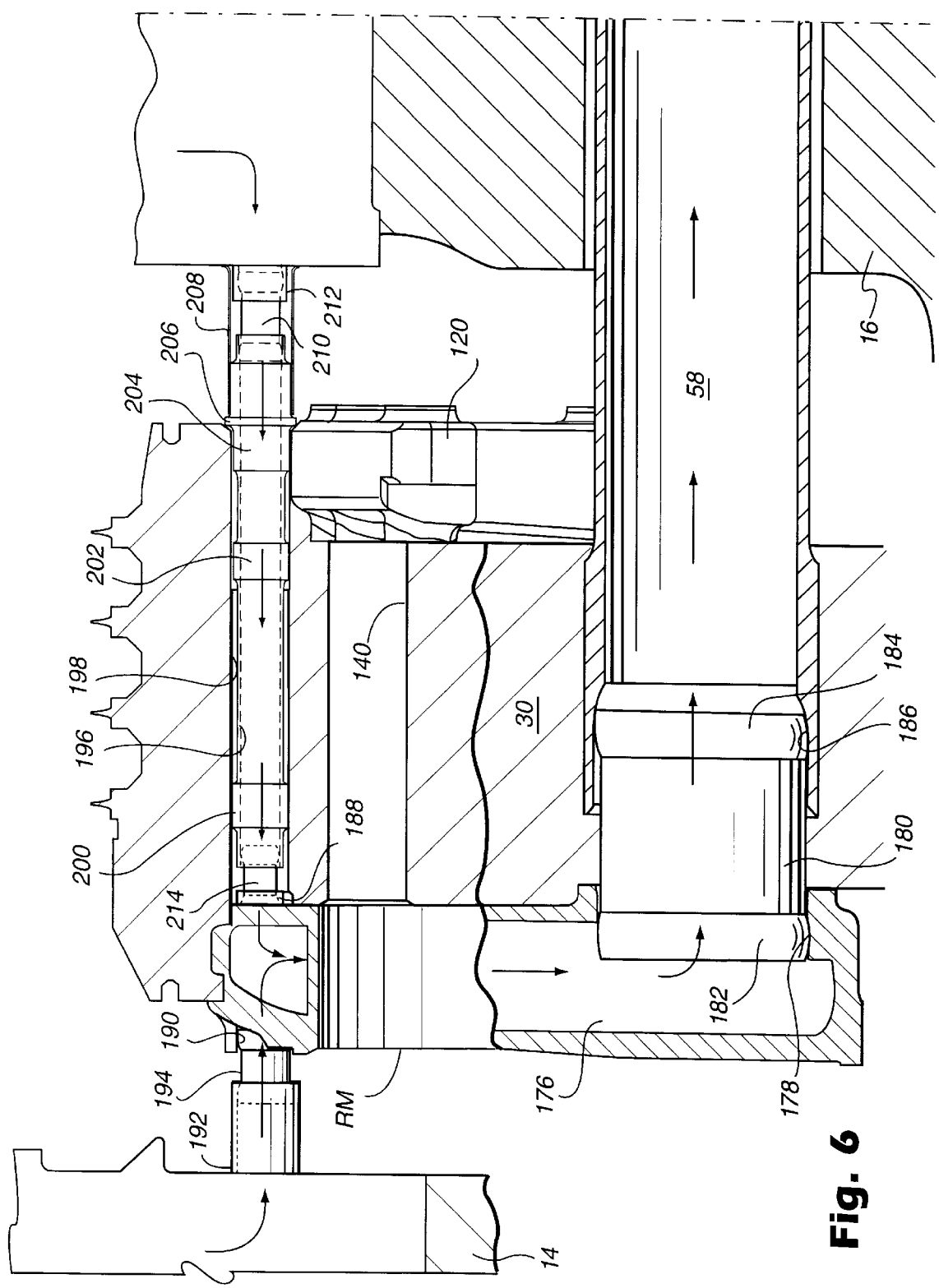
FIG. 6 is a fragmentary cross-sectional view illustrating a return manifold segment for returning spent cooling medium from axially adjacent buckets to a return tube and taken generally about on line 6—6 of FIG. 4.
Figure 7:
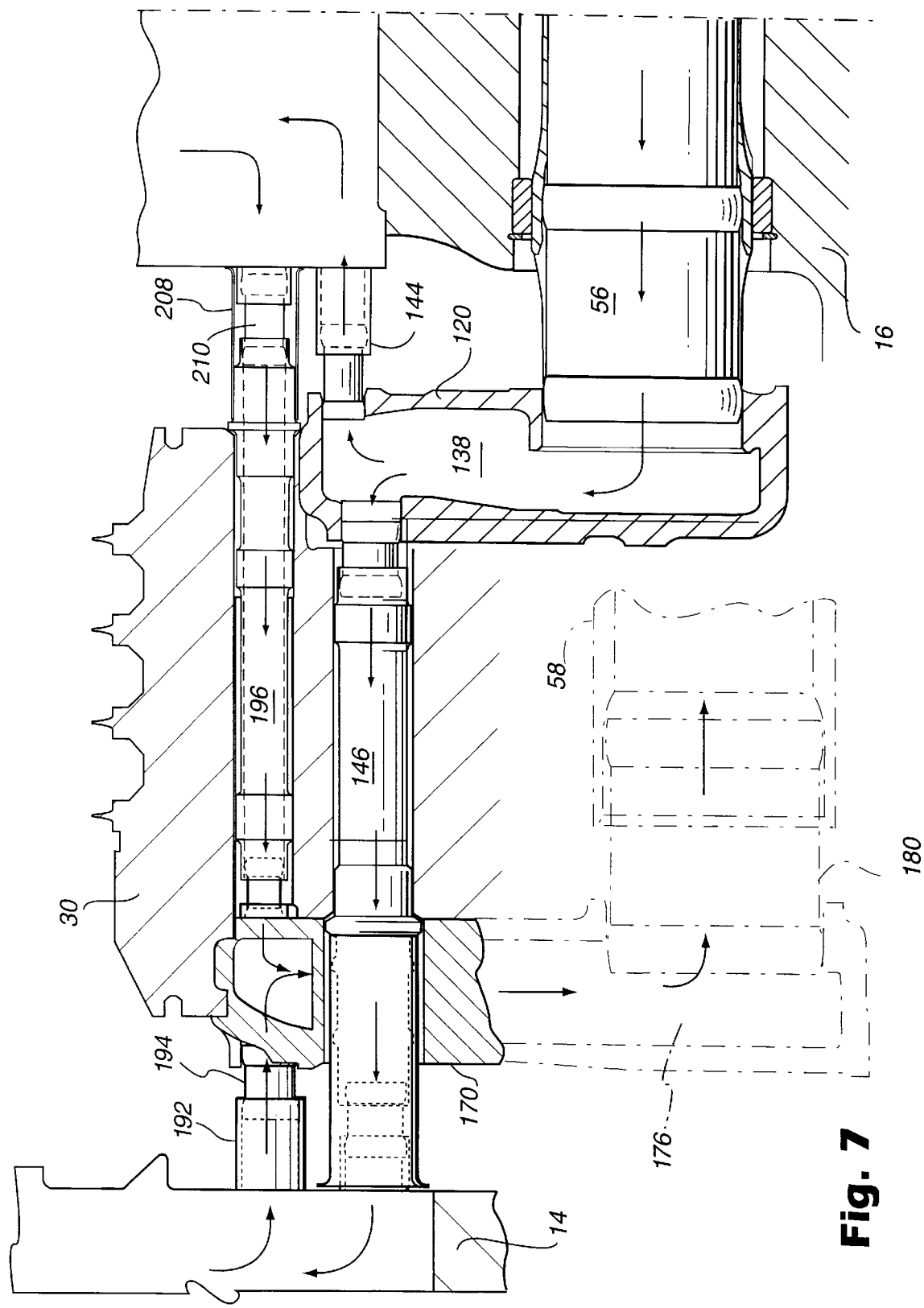
FIG. 7 is a reduced cross-sectional view illustrating the relationship between the supply and return manifold segments.
Figure 8:
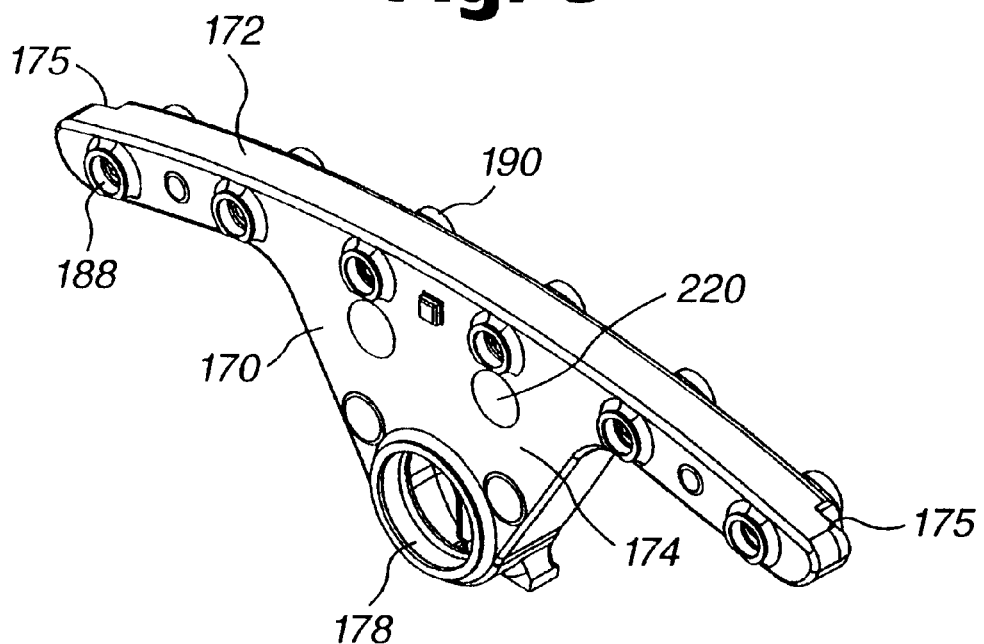
FIGS. 8 and 9 are perspective views of the return and supply manifold segments, respectively.

Referring now to FIG. 6, spent cooling medium from the buckets of the first and second-stage wheels returns to return manifolds, generally designated RM, which, in turn, supply the spent cooling steam to the return tubes 58. The return manifolds RM comprises a plurality of circumferentially spaced return manifold segments 170 (FIG. 8), preferably located between the forward face of the spacer 30 and the aft face of the first-stage wheel 14. Referring to FIG. 8, each segment has a radially outer rim 172 and an inwardly extending projection 174, the rim 172 and projection 174 defining a plenum 176. Each projection 174 has an exit port 178 opening in an axially aft direction for flowing return steam from the manifold segment 170 to the return tube 158 by way of a spoolie 180. The outlet or exit port 178 has a generally annular seat for mating engagement with the spherical end portion 182 of the spoolie 180. The opposite end of the spoolie 180 has a similar spherical portion 184 for engaging an annular seat 186 at the forward end of the return tube 58.

The rim 172 of each return manifold segment 170 includes a plurality, for example, six, inlet ports 188 opening in an aft direction, as well as a plurality, for example, six, inlet ports 190 opening in a forward direction. To communicate spent cooling medium from the buckets 22 of the first stage to manifold segment 170, an extension 192 is preferably integrally cast on the aft face of each of the bucket dovetails of the first-stage buckets 22 and forms a cooling medium outlet therefor. A spoolie 194 having opposite spherical end portions seats in annular portions at the end of each extension 192 and each inlet ports 190, respectively. Consequently, spent cooling medium flows from the buckets 22 of the first stage through the extensions 192, spoolies 194 and inlet ports 190 into the circumferentially arranged manifold plenums 176.

To communicate spent cooling steam from the buckets 24 of the second stage to the return manifold plenum 176, a plurality of crossover return tubes 196 are provided through axially extending bore holes 198 through the intervening spacer 30. The return crossover tubes 196 each have lands 200, 202 and 204 for engaging the bore hole 198. An enlarged diameter flange 206 bears against the margin of the opening 198 through spacer 30 to prevent forward axial movement of the return crossover tube 196. A retention sleeve 208 engages the flange 206 at one end and has a flared opposite end defining a small axial gap with the forward face of the second-stage bucket. Consequently, the crossover tube 196 is fixed against axial movement in a forward direction by engagement of its flange 206 against the aft face of spacer 30 and limited in its axial rearward movement by engagement of the flared end of the retention sleeve against the forward face of the second-stage buckets, the forward end of the sleeve 208 bearing against flange 206.

As in previous embodiments, spoolies 210 interconnect forward preferably integrally cast extensions 212 of the second-stage buckets with the aft ends of the crossover tubes 196, extensions 212 forming cooling medium outlets for the second-stage buckets. Similarly, spoolies 214 interconnect between the forward ends of the return crossover tubes 196 and the inlet ports 188 of the return manifold segments 170. The spoolies 210 and 214 are of similar construction as previously described, i.e., having spherical portions at opposite ends for seating in annular surfaces of the adjoining parts.

As illustrated in FIG. 6, it will be appreciated that the crossover tubes 196 pass over the axially adjacent radially inset supply manifold segment 120. Referring back to FIGS. 4 and 5, however, it will be seen that at least a pair of the supply crossover tubes 146 interconnecting the supply manifold segments 120 and the first-stage buckets 22 and located at the opposite ends or tips of the supply manifold segments rims 122 pass axially through openings 220 (FIGS. 4 and 6) formed in a central portion of the return manifold segment 170 at the same circumferential locations. The remaining supply crossover tubes 146 from the supply manifold segments 120 pass under the outer wings of the rims 172 of circumferentially adjacent return manifold segments 170. Also note from a review of FIG. 4 that not only are the supply manifold segments 120 spaced radially inwardly of the return manifold segments 170 but the segments 120 and 170 are staggered relative to one another in a circumferential direction.

Each return manifold segment also includes recesses 175 at the tips of the wings of the manifold segment and along a forward face thereof. Circumferentially spaced radially inwardly directed flanges 177 (FIG. 5) on the forward face of the spacer 30 engage in recesses 175 to retain the return manifold segment in position together with the return tube.

To recapitulate the return cooling system for the buckets of the first and second stages, spent cooling medium, e.g., steam, flows aft from the first-stage buckets 22 through dovetail extensions 192 and spoolies 194 into return manifold segment plenums 176 via inlet ports 190. Spent cooling steam from the second-stage buckets 24 flows forwardly from the bucket dovetail extensions 212 via spoolies 210 and crossover tubes 196 and spoolies 214 into the return manifold segment plenums 176 via inlet ports 188. The spent cooling steam flows from plenums 176 by way of spoolies 180 into return tubes 58 for flow through the associated elbow and radial tube and axial passage 88 to the return.

Figure 15:
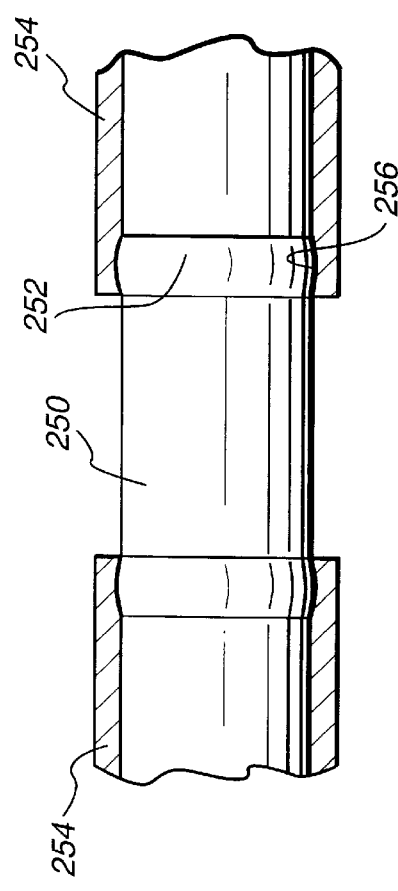
FIG. 15 is a fragmentary elevational view of a representative spoolie having spherical end portions engaged in spherical seats of adjoining parts illustrated in cross-section.

It will also be appreciated that while the connecting part may have an annular seat, the spherical end portions 132 of the thin-wall spoolies may interface with spherical seats on the mating parts to prevent disengagement and/or crushing during operation. Spherical seats are particularly significant in radial orientations of the spoolies to prevent radial movement under centrifugal loads. The interference fit at the spoolie ends prevents leakage, provides a sufficient preload to overcome centrifugal loads and affords self-alignment during operation. The spherical ends of the spoolies are preferably coated with Triballoy 800. An example of a spherical end portion of a spoolie and a spherical seat therefor is illustrated in FIG. 15. The spoolie 250 may comprise any one of the spoolies 128, 142, 148, 162, 194, 210, 214 or 170 having spherical end portions 252. The adjoining parts 254 may have annular seats or the spherical seats 256 as illustrated.

Figure 10:
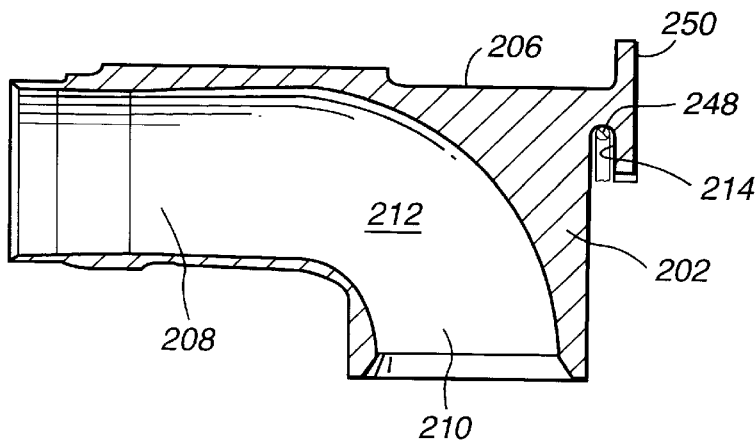
FIGS. 10 and 11 are cross-sectional views of supply and return elbows, respectively, for turning the cooling medium between axial and radial flow directions.

Referring now to FIGS. 2, 3B and 10–14, the interconnections, e.g., elbows, in the aft disk 46 for transitioning the supply and return thermal medium between axial and radial directions will now be described. Referring to FIG. 2, the aft disk 46 includes a plurality of circumferentially spaced generally dovetailed radially opening slots 200. The slots 200 receive supply and return interconnections, e.g., elbows 202 and 204, respectively. Each of the elbows has a generally complementary-shaped exterior surface to the dovetails about aft disk 46 such that the elbows can be axially inserted into the slots 200 and retained against radial outward movement. Referring to FIG. 10, a supply elbow 206 is illustrated. Supply elbow 206 is preferably formed of cast material and has a longitudinally extending bore section 208 and a radial extending bore section 210 in communication with one another through a transition bore 212 turning 90° as illustrated. The aft end of the elbow 206 includes a groove 214 opening radially inwardly.

Figure 11:
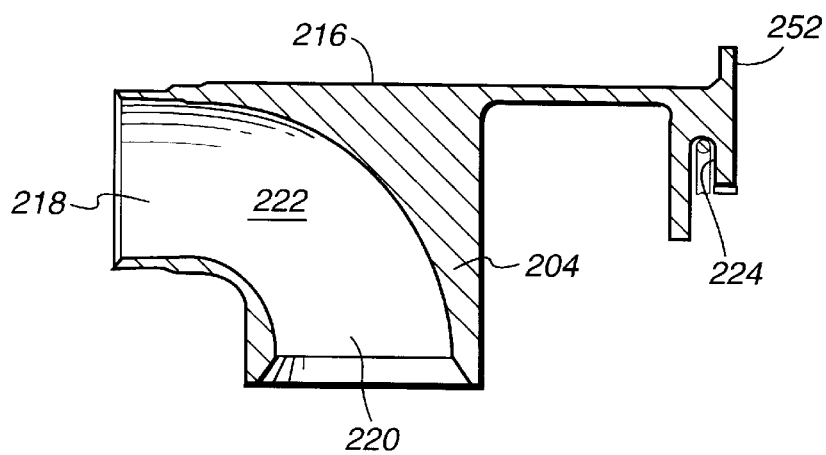

Referring to FIG. 11, a return elbow 216 is illustrated. Return elbow 216 includes an axially extending bore opening 218 and a radially extending bore opening 220 in communication one with the other through a transition bore 222 turning 90°. The aft end of the return elbow 216 also includes a groove 224 opening radially inwardly. It will be appreciated that the radially opening bores 210 and 220 of the supply and return elbows 206 and 216, respectively, are both circumferentially and axially offset one from the other to accommodate the circumferentially and radially offset supply and return tubes 54 and 60, respectively.

The axially extending bores 208 and 218 of the supply and return elbows 206 and 216, respectively, interconnect with the axially extending supply and return tubes 56 and 58 by way of spoolies constructed similarly as the spoolies previously described. An example of a spoolie 226 for interconnecting the return elbow 216 and the return axially extending tube 58 is illustrated in FIG. 3A. A similar spoolie interconnects each of the supply elbows 206 and the supply tubes 56.

Figure 12:
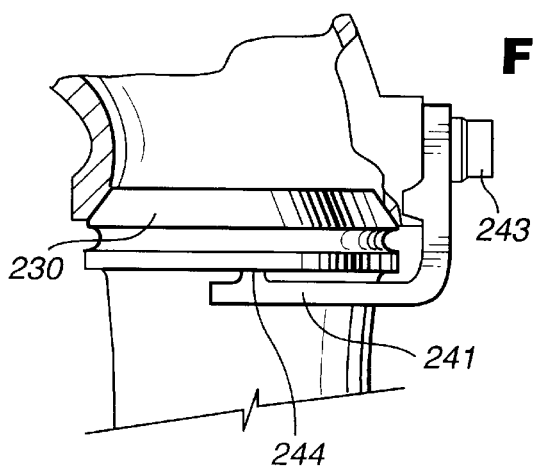
FIG. 12 is a fragmentary side elevational view with parts in cross-section illustrating a connection between an elbow and a radially extending thermal medium carrying tube of the aft disk.
Figure 13:
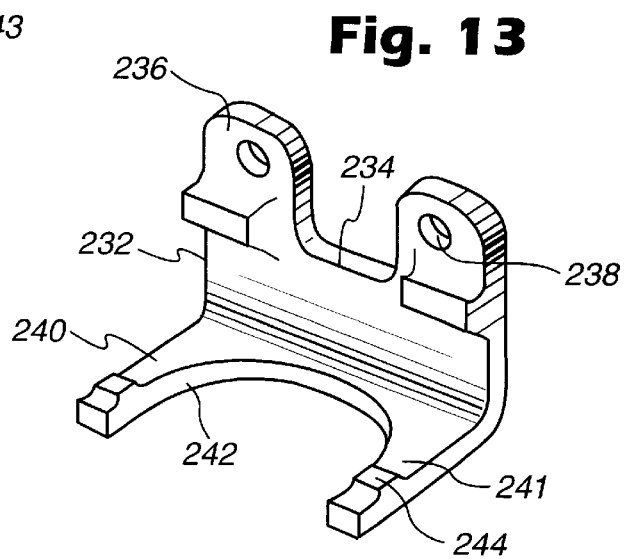
FIG. 13 is a perspective view of a spring clip for effecting connection between the elbow and radial tube.

Referring to FIG. 12, each of the radially outer ends of the supply and return tubes 54 and 60, respectively, have a collar 230. The outer end of the collar is flared for flared mating engagement with the radial extending bore 210 or 220 of the associated elbow to establish fluid communication between the elbow and radial tube. To interconnect the radial tube and the elbows, a spring clip 232, illustrated in FIG. 13, is provided. The spring clip comprises an angle having a radial portion 234 mounting circumferentially spaced radially outwardly directed bosses 236 with openings 238. The generally axially extending portion 240 of the spring clip 232 has a pair of axially extending legs 241 defining a generally semi-circular opening 242 and terminating in a pair of radially outwardly projecting bosses 244 adjacent distal ends thereof. As illustrated in FIG. 12, the spring clip 232 is bolted to the associated elbow 206 or 216 with the bolts 243 with the arms of the axial section 240 underlying the collar 230. Specifically, the bosses 244 engage the undersides of the collar 230.

Figure 14:
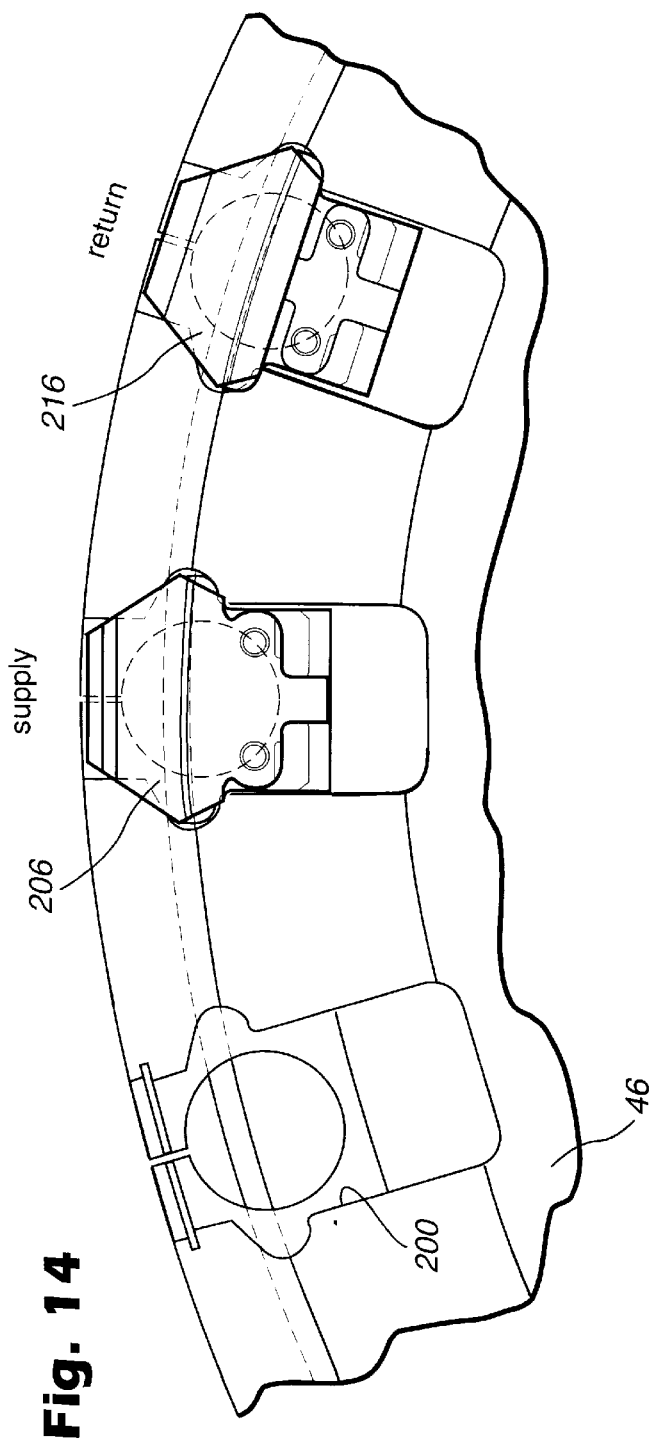
FIG. 14 is a fragmentary elevational view looking in a forward direction at the aft disk.

As illustrated in FIG. 3B, the aft face of the aft disk 42 between the slots 200 has radially inwardly opening grooves 246. It will be appreciated that when the elbows 206 and 216 are axially inserted into the slots 200, a circumferentially extending band or wire 248, which may be spring-loaded in a radially outer direction, is inserted into the grooves 214, 224 and 246 to retain the elbows against axial displacement in an aft direction, the grooves 246 and band 248 forming axial stops for the elbows. The aft flanges 250 and 252 of the elbows 206 and 216, respectively, butt against the aft face of the aft disk 46 to preclude forward axial movement of the elbows relative to the rotor. FIG. 14 illustrates a supply and return elbow in the corresponding slots 200 of the aft disk 46.

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

What is claimed is:

1. In a turbine rotor having axially spaced wheels mounting buckets, and spacers between said wheels, a cooling system for cooling the buckets, comprising:

a plurality of cooling medium supply passages circumferentially spaced from one another about and adjacent a rim of the rotor;

a plurality of spent cooling medium return passages circumferentially spaced from one another about and adjacent the rim of the rotor;

a plurality of supply manifold segments circumferentially spaced from one another about and adjacent the rim of said rotor, each said supply manifold lying in communication with at least one of said supply passages for receiving the cooling medium, each said supply manifold segment having a plurality of supply ports connecting said supply manifold segment and cooling medium inlets for the turbine buckets of the axially spaced wheels; and a plurality of return manifold segments circumferentially spaced from one another about and adjacent a rim of said rotor, each said return manifold segment lying in communication with at least of one of said return passages for receiving spent cooling medium, each said return manifold segment having a plurality of return ports connecting said return manifold segment and spent cooling medium outlets for the turbine buckets of the axially spaced wheels.

2. A cooling system according to claim 1 including a first set of said plurality of supply ports for each supply manifold segment for supplying the cooling medium to a set of buckets on one of said wheels, a second set of said plurality of supply ports for each supply manifold segment for supplying the cooling medium to a second set of buckets on another of said wheels.

3. A cooling system according to claim 2 including at least one spoolie interconnecting each of said first and second sets of supply ports and the respective sets of buckets of said one and said another wheels.

4. A cooling system according to claim 1 including a first set of said plurality of return ports for each return manifold segment for returning the spent cooling medium from a set of buckets on one of said wheels, a second set of said plurality of return ports for each return manifold segment for returning the spent cooling medium from a set of buckets on another of said wheels.

5. A cooling system according to claim 4 including spoolies interconnecting each of said first and second sets of return ports and the respective sets of buckets of said one and said another wheels.

6. A cooling system according to claim 1 including a first set of said plurality of supply ports for each supply manifold segment for supplying the cooling medium to a set of buckets on one of said wheels, a second set of said plurality of supply ports for each supply manifold segment for supplying the cooling medium to a second set of buckets on another of said wheels, a first set of said plurality of return ports for each return manifold segment for returning the spent cooling medium from a set of buckets on said one wheel, a second set of said plurality of return ports for each return manifold segment for returning the spent cooling medium from a set of buckets on said another wheel.

7. A cooling system according to claim 1 wherein said supply manifold segments and said return manifold segments are axially spaced from one another along the turbine rotor and lie on opposite axial sides of a spacer between said axially spaced wheels.

8. A cooling system according to claim 7 including a set of said plurality of supply ports for each supply manifold segment for supplying the cooling medium to a set of buckets on one of said wheels, tubes extending through said spacer and interconnecting said set of supply ports and the set of buckets on said one wheel, a set of said plurality of return ports for each return manifold segment for returning the spent cooling medium from a set of buckets on another of said wheels, tubes extending through said spacer and interconnecting said set of return ports and the set of buckets on said another wheel.

9. A cooling system according to claim 8 wherein one of said first tubes and said second tubes extends through one of said supply manifold segments and said return manifold segments.

10. A cooling system according to claim 1 wherein said supply manifold segments and said return manifold segments are axially spaced from one another and are staggered relative to one another in a circumferential direction.

11. A cooling system according to claim 1 wherein said supply manifold segments and said return manifold segments are axially spaced from one another and offset from one another in radial directions.

12. A cooling system according to claim 1 wherein said supply manifold segment includes an arcuate rim and a radially inwardly extending projection, said projection having an inlet port in communication with one of said cooling medium supply passages for receiving cooling medium therefrom.

13. A cooling system according to claim 1 wherein said return manifold segment includes an arcuate rim and a radially inwardly extending projection, said projection having an outlet port in communication with one of said cooling medium return passages for receiving spent cooling medium therefrom.

14. A cooling system according to claim 1 wherein each said supply manifold segment and said return segment includes an arcuate rim and a radially inwardly extending projection intermediate opposite ends of said rim, said projection of each said supply manifold segment having an inlet port in communication with one of said cooling medium supply passages for receiving cooling medium therefrom, said projection of each said return manifold segment having an outlet port in communication with one of said spent cooling medium return passages for receiving spent cooling medium therefrom.

15. A cooling system according to claim 14 wherein said supply manifold segments and said return manifold segments are axially spaced from one another and are staggered relative to one another in a circumferential direction, said supply manifold segments and said return manifold segments being offset from one another in radial directions.

16. A cooling system according to claim 1 wherein said supply manifold segments and said return manifold segments are axially spaced from one another and are staggered relative to one another in a circumferential direction, said supply manifold segments and said return manifold segments being offset from one another in radial directions, a set of said plurality of supply ports for each supply manifold segment for supplying the cooling medium to a set of buckets on one of said wheels, tubes extending through said spacer and interconnecting said set of supply ports and the set of buckets on said one wheel, a set of said plurality of return ports for each return manifold segment for returning the spent cooling medium from a set of buckets on another of said wheels, tubes extending through said spacer and interconnecting said set of return ports and the set of buckets on said another wheel.

17. A cooling system according to claim 16 wherein one of said supply tubes and said return tubes extends through one of said supply manifold segments and said return manifold segments.

18. A cooling system according to claim 1 wherein said cooling medium supply passages and said spent cooling medium return passages extend generally axially along the rim of the rotor, a plurality of generally radially extending cooling medium supply and return passages in communication with said respective axially extending supply and return passages, and elbows interconnecting said radially and axially extending passages and having passageways for transitioning thermal medium flow between radial and axial directions, said rotor including an aft disk having radially opening slots spaced circumferentially from one another for receiving and retaining the elbows within said slots.

19. A cooling system according to claim 18 wherein said slots open in an axial direction, said elbows being receivable in said slots in an axial direction, and a stop for retaining said elbows in said slots against axial movement in an aft direction.

20. A cooling system according to claim 1 wherein at least one said cooling medium inlets and said cooling medium outlets for the turbine buckets is formed of integral cast axial extensions of the buckets machined to provide axial openings, and spoolies having spherical end portions engaging in said openings.

21. In a turbine rotor having axially spaced wheels mounting buckets, and spacers between said wheels, a cooling system for cooling the buckets, comprising:

a plurality of generally axially extending cooling medium supply passages circumferentially spaced from one another about and adjacent a rim of the rotor;

a plurality of generally axially extending spent cooling medium return passages circumferentially spaced from one another about and adjacent the rim of the rotor;

first and second sets of a plurality each of generally radially extending passages for respectively supplying the cooling medium to said cooling medium axial supply passages and returning the spent cooling medium from said spent cooling medium axial return passages;

an aft disk forming part of said rotor and having axial extending slots about a periphery thereof; and a plurality of flow turning elements disposed in said slots interconnecting said axial and radially extending passages and having passageways for turning flow between generally axial and radial directions.

22. A cooling system according to claim 21 wherein said axial extending passages comprise tubes extending in axially registering bore holes through the wheels and spacers, said radially extending passages comprising tubes extending in bore holes through said aft disk, said passageways of said flow turning elements lying in communication with said axially and radially extending tubes.

23. A cooling system according to claim 21 wherein said slots open in an axial direction, said elements being receivable in said slots in an axial direction, and a stop for retaining said elements in said slots against axial movement in an aft direction.

24. In a turbine rotor having axially spaced wheels mounting buckets, and spacers between said wheels, a cooling system for the buckets comprising:

a plurality of generally axially extending cooling medium conveying passages circumferentially spaced from one another about and adjacent a rim of the rotor and lying in communication with the buckets;

a plurality of generally radially extending passages in communication with said axial passages for conveying the thermal medium;

an aft disk forming part of said rotor and having axially extending slots about a periphery thereof; and a plurality of flow turning elements disposed in said slots interconnecting said axial and radial extending passages and having passageways for turning flow between generally axial and radial directions.

25. A cooling system according to claim 24 wherein said axial extending passages comprise tubes extending in axially registering bore holes through the wheels and spacers, said radially extending passages comprising tubes extending in bore holes through said aft disk, said passageways of said flow turning elements lying in communication with said axially and radially extending tubes, said slots opening in an axial direction and said elements being receivable in said slots in said axial direction.

26. A cooling system according to claim 25 including a member engaging between said elements and said aft disk maintaining said elements against axial movement in said slots in one axial direction.

27. In a turbine rotor having axially spaced wheels mounting buckets, and spacers between said wheels, a cooling system for cooling the buckets, comprising:

a cooling medium supply passage extending generally axially along said rotor;

a cooling medium return passage extending axially along said rotor;

a supply manifold adjacent the rim of said rotor in communication with said supply passage for receiving the cooling medium, said supply manifold having a plurality of supply ports connecting said supply manifold and cooling medium inlets for the turbine buckets of the axially spaced wheels; and a return manifold adjacent a rim of said rotor in communication with said return passage for receiving spent cooling medium, said return manifold having a plurality of return ports connecting said return manifold and spent cooling medium outlets for the turbine buckets of the axially spaced wheels; and thin-walled spoolies having spherical end portions disposed between (i) said supply manifold and said cooling medium inlets and (ii) said return manifold and said spent cooling medium outlets.

28. A cooling system according to claim 27 wherein said spoolies adjoin mating parts having spherical seats for said spherical end portions of said spoolies.

* * * * *